CALLING STATION IDENTIFICATION CIRCUIT

Filed Jan. 28, 1950 17 Sheets-Sheet 1

INVENTOR
BY D. S. BARLOW
[signature]
ATTORNEY

March 16, 1954 D. S. BARLOW 2,672,515

CALLING STATION IDENTIFICATION CIRCUIT

Filed Jan. 28, 1950 17 Sheets-Sheet 2

FIG. 2 PRIMARY NETWORK PDN-A

INVENTOR
D. S. BARLOW
BY [signature]
ATTORNEY

SECONDARY NETWORK SDV

INVENTOR
D. S. BARLOW
BY [signature]
ATTORNEY

CALLING STATION IDENTIFICATION CIRCUIT

Filed Jan. 28, 1950 17 Sheets-Sheet 4

SECONDARY NETWORK SDH

INVENTOR
D. S. BARLOW
BY [signature]
ATTORNEY

March 16, 1954 D. S. BARLOW 2,672,515

CALLING STATION IDENTIFICATION CIRCUIT

Filed Jan. 28, 1950 17 Sheets-Sheet 5

INVENTOR
D. S. BARLOW
BY
ATTORNEY

March 16, 1954 D. S. BARLOW 2,672,515

CALLING STATION IDENTIFICATION CIRCUIT

Filed Jan. 28, 1950 17 Sheets-Sheet 6

INPUT GATE CIRCUIT B

INVENTOR
D. S. BARLOW
BY [signature]
ATTORNEY

March 16, 1954 D. S. BARLOW 2,672,515

CALLING STATION IDENTIFICATION CIRCUIT

Filed Jan. 28, 1950 17 Sheets-Sheet 7

INPUT GATE CIRCUIT C

INVENTOR
D. S. BARLOW
BY [signature]
ATTORNEY

March 16, 1954 D. S. BARLOW 2,672,515

CALLING STATION IDENTIFICATION CIRCUIT

Filed Jan. 28, 1950 17 Sheets-Sheet 8

FIG. 8 INPUT GATE CIRCUIT D

INVENTOR
D. S. BARLOW
BY
ATTORNEY

CALLING STATION IDENTIFICATION CIRCUIT

Filed Jan. 28, 1950 17 Sheets-Sheet 9

FIG. 9 DIGIT SCANNING CCT.

INVENTOR
D. S. BARLOW
BY
ATTORNEY

SLEEVE IMPEDANCE CHECK CCT.

INVENTOR
D. S. BARLOW
BY
ATTORNEY

INVENTOR
D. S. BARLOW
BY
ATTORNEY

March 16, 1954 D. S. BARLOW 2,672,515

CALLING STATION IDENTIFICATION CIRCUIT

Filed Jan. 28, 1950 17 Sheets-Sheet 12

CODE CHECK CCT.

INVENTOR
D. S. BARLOW
BY
[signature]
ATTORNEY

FIG. 13 OUTPUT CIRCUIT

INVENTOR
D. S. BARLOW
BY [signature]
ATTORNEY

INVENTOR
D. S. BARLOW
BY
ATTORNEY

RECORDER REGISTERS

INVENTOR
D. S. BARLOW
BY
ATTORNEY

March 16, 1954 D. S. BARLOW 2,672,515
CALLING STATION IDENTIFICATION CIRCUIT
Filed Jan. 28, 1950 17 Sheets-Sheet 16
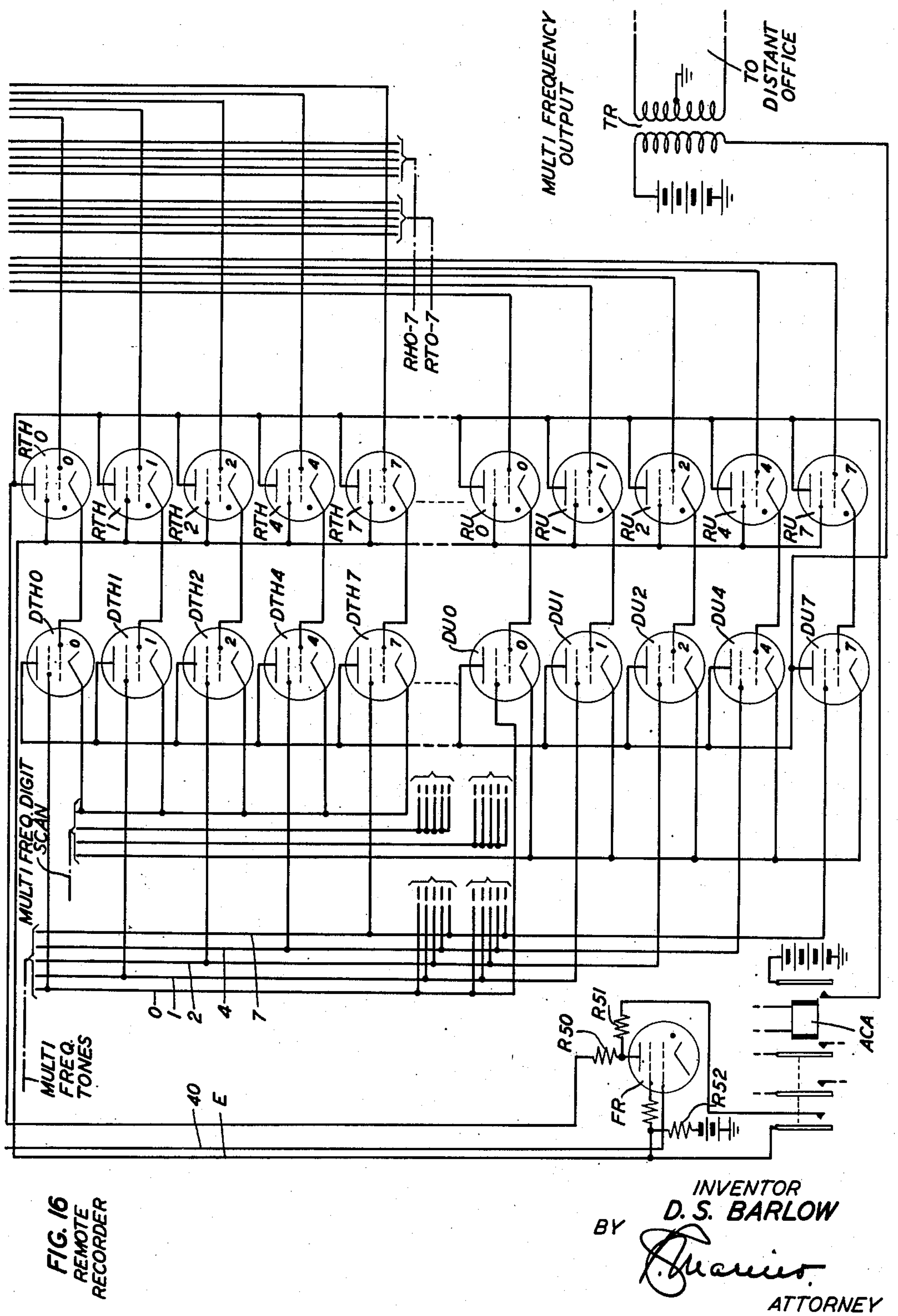
FIG. 16 REMOTE RECORDER
INVENTOR
D. S. BARLOW
BY
ATTORNEY INVENTOR
D. S. BARLOW
BY [signature]
ATTORNEY Patented Mar. 16, 1954

2,672,515

UNITED STATES PATENT OFFICE 2,672,515

CALLING STATION IDENTIFICATION CIRCUIT

Dick S. Barlow, Port Washington, N. Y., assignor to Bell Telephone Laboratories, Incorporated, New York, N. Y., a corporation of New York Application January 28, 1950, Serial No. 141,141

38 Claims. (Cl. 179—7)

This invention relates to identification devices and particularly to devices for determining the directory number of telephone stations and other specific information individual to the stations, which may be useful in the billing of connections established therefrom, or for other purposes.

The identification of the directory number of a telephone station presents difficulties in those telephone systems where the directory number of a station differs from that of the equipment terminal to which the line of the station is connected in the central office. Particularly is this true in the case of party lines, for example, where a plurality of stations are connected to one line which has but one equipment terminal number, while each of the stations thereon has an individual directory number. The problem of directory number identification is further complicated by P. B. X line groups, each line in a group having its own directory number but which, for purposes of billing, it may be desirable to identify the directory number of some other line or some arbitrary directory number to which the call is to be charged, rather than that of the line which established the call.

Further difficulties also arise in those identification arrangements which are adapted to identify the line or station with apparatus which is responsive to an identifying signal applied to a conductor of the line or the extension thereof. For instance, if the signal comprises a high frequency potential, crosstalk may be induced in other conductors included in the same cable as the conductor to which the signal is applied, which will result in the signal being induced in said other conductors. Again, if the conductor to which the signal is applied is a part of the sleeve or holding conductor of the connection, the magnets of the switch train held thereover will drain off a part of the signal energy, reduce its intensity and thereby impair the operation of the detecting apparatus, the latter result also occurring if, for any reason, the continuity of the signal is interrupted or its amplitude is reduced by transient disturbances such as inductive interference, short circuits, momentary opening of contacts and the like.

It is the main object of the present invention to achieve a station identifier which is free from the above defects, is rapid in operation, is self-checking to insure accuracy of identification, contains a minimum number of moving parts and is relatively of simple construction to yield low cost of equipment and low cost of maintenance.

A particular feature of the invention is the provision as part of the identifier of a number of "primary" networks of passive electrical elements, one such element being provided in one of the networks for each directory number to be identified through such network, the elements in each network being so interconnected by conductive paths that low-loss signal transmission is afforded along paths indicative of the directory number to be identified and high-loss signal transmission is afforded along all other paths.

Another feature of the invention is the provision of two similar but "secondary" networks of passive electrical elements for each primary network and of substantially similar electrical properties as a primary network, by means of which each of the digits of the directory number indicated by the presence of the identifying signal along certain conducting paths of a primary network is "compressed" into a suitable code that expresses the digit. It is obvious, of course, that a suitable signal-detecting unit could be provided at each conductive path of a primary network, and by the response of appropriate detecting units to the signal on certain of the paths, provide an identification of the number. Such an arrangement, however, while entirely feasible and included as part of the present invention, involves the use of an excessive amount of detecting equipment. The two secondary networks of passive elements are, therefore, provided with each primary network in order that the ten values of each digit of the number may be expressed by a uniform code which involves at each pair of secondary networks a less number of conductive paths than in the associated primary network. This arrangement makes it possible to provide a minimum quantity of apparatus for detecting the presence of the identifying signal, and which apparatus can be activated in accordance with the particular pair of secondary networks to which the identifying signal is transmitted from the associated primary network.

Another feature of the invention is the use of a low impedance, high frequency signal source, and a correspondingly low termination impedance, including a high-pass filter, into which the source works for purposes of identification. The use of such a high frequency source and termination impedance substantially reduces crosstalk over sleeve conductors, noise, power consumption and other undesirable disturbing factors.

Still another feature of the invention is the provision of a discriminating device as a part of the identifier by means of which the integrity of the identifying signal at the passive elements of a particular pair of secondary networks is checked for the proper frequency, amplitude and duration before it is accepted for transmission to the registers which are to be set in accordance therewith for registering the identified directory number.

Still another feature of the invention is a check circuit associated with the signal source which, at the time an identification is to be made, measures the impedance of the sleeve conductor of the connection and which, if the value thereof is more or less than a predetermined value, prevents the identifier from proceeding with further operations.

In using the identifier to identify the directory number of a calling station, for example, its utility lies in causing a record to be made of the identified number, which record is subsequently used for charging the call to the station that made it. In a telephone exchange adapted for the automatic recording of items of record information, it is the more efficient practice to provide one recording device for each group of trunks over which connections are established, and to associate said recording device temporarily with a trunk in the group whenever some item of information is to be recorded in respect to a connection established, or being established, over the trunk. Accordingly, it is another feature of the invention to associate the identifier "electronically" with the several recording devices in the exchange, to obtain the directory number identification of a calling station extended to a trunk, and to activate the one recording device which has access to the trunk group that includes said trunk, thereby to transmit the identified directory number only to the recording device associated with said trunk. By a novel electronic arrangement between the identifier and the several recording devices, electromagnetic switching apparatus ordinarily used for establishing temporary connections between the identifier and each of the several recording devices as required is thereby avoided, thus conserving space and reducing the cost of the apparatus.

It is sometimes desirable in a telephone system to record information pertaining to a connection at an exchange remote from the exchange at which the call is originated. Accordingly, it is another feature of the present invention to provide for the transmission of signals characteristic of an identified directory number to a recording device at a remote location; and to effect this transmission by means of a plurality of frequencies selectively combined in accordance with a predetermined code to represent each of the digits of the identified number.

These and other features of the invention will be more clearly understood from the following description, appended claims and attached drawings in which:

Fig. 16 shows the registers in the calling office for a recorder located in a remote office, and a circuit for transmitting coded frequency impulses of a number registered in the digit register to the remote office;

Fig. 17A is a skeletonized circuit diagram indicating certain electrical characteristics of a primary network;

Fig. 17B is a skeletonized arrangement of a portion of a primary network to better disclose certain other characteristics of said network, while Fig. 18 shows the manner in which Figs. 1 to 16, inclusive, should be arranged with respect to each other in order to disclose the invention completely.

I will first describe the arrangement and functions of various parts of the disclosure, and will then describe in detail its operation with respect to the identification and recording of a representative directory number of a calling station.

Figure 1:
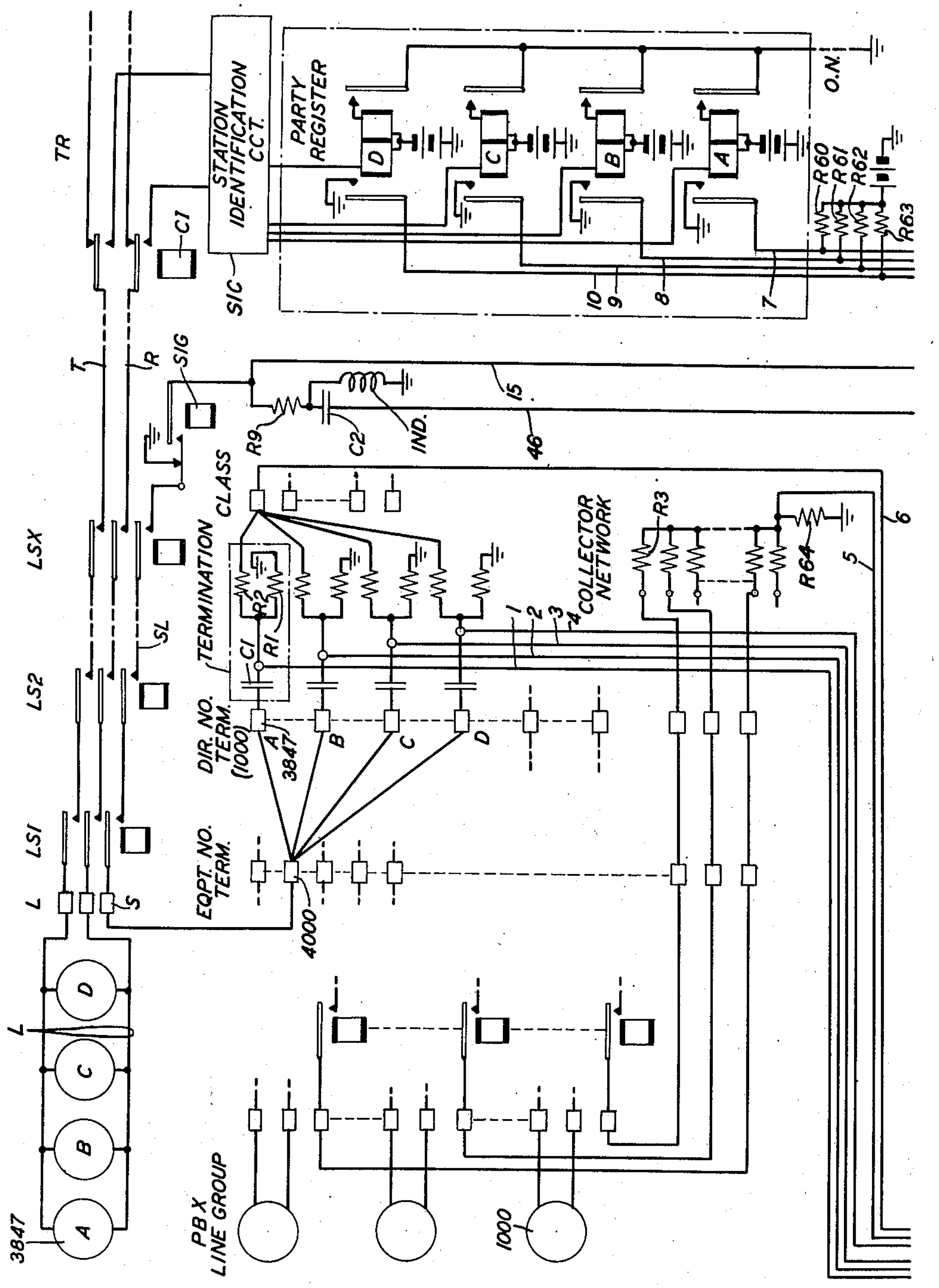
Fig. 1 shows a telephone line with four telephone stations thereon, a switching train by which the line is extended to a trunk, a private branch exchange line group, and wiring connections between the various lines and associated equipment and directory number terminals.

Fig. 1 shows a telephone line L connected to the terminals of a switch LS1 in a central office. The line is provided with four telephone stations A, B, C and D each having an individual directory number, it being assumed for purposes of illustration that station A has the directory number 3847. When a station on the line L, for example station A, originates a call, the line is extended in the usual manner over switching selectors LS1, LS2, LSX of any suitable construction, to the trunk TR, from which the connection is then further extended under the control of a register sender in accordance with the dialed called office code registered therein. Since the manner in which the line is extended to and beyond the trunk forms no part of the present invention, the means by which such extensions are effected are not shown and will not be described.

Fig. 1 further shows a "station identification circuit" SIC which, when relay CI is operated in any suitable manner, is connected to the tip and ring conductors T and R of the trunk. The circuit SIC may be of the type disclosed in Patent No. 2,306,173, issued to M. A. Logan on December 22, 1942, and its purpose is to determine which of the four stations A, B, C and D has originated the call. When the determination has been made, for example in the manner set forth in the above-identified patent, the identity (but not the directory number) of the calling station is registered by the operation of one of the four relays A, B, C or D, the latter constituting a "party register" which is either temporarily associated with the trunk for the time taken to identify the directory number of a calling station as hereinafter set forth, or is otherwise a permanent part thereof. Thus, for example, if the call is originated by station A, the circuit SIC will determine the fact and cause the operation of relay A of the party register, which relay, when operated, locks to off-normal ground over its locking winding to perform certain functions later to be described. In the same manner, if the call is originated by station B or C or D, the circuit SIC will make the appropriate station identification and cause the operation of relays B or C or D, respectively, in the trunk party register.

The sleeve terminal S of the line L is connected by a conductor to a terminal in the Equipment Number Terminals, indicated in Fig. 1 by the vertical column of terminals under the legend "Eqpt. No. Term." This terminal indicates the "equipment location" of the line on the line switch LS1. If, for example, the telephone exchange in which the invention is to be practiced has a capacity for 10,000 lines, there would be up to 10,000 such cross-connecting terminals in the Equipment Number Terminal group, each terminal in the group designating a particular location on the terminal banks or contacts of the line switches to which a line is terminated. Conductors are then extended from the sleeve terminals S of the several lines in the office to the equipment number terminals in accordance with the "equipment terminal location" of each of said lines. In the present embodiment of the invention, herein disclosed by way of illustration, it is assumed that the office containing line L has a capacity of 10,000 lines. Accordingly, there would be up to 10,000 terminals in the Equipment Number Terminal Group to which conductors from the sleeve terminals S of the line switches extend in accordance with the equipment location of the several lines connected to said line switches. It will be observed that, as illustrative of the general arrangement, the sleeve terminal S of the line L is extended by a conductor to the cross-connecting terminal 4000, indicating thereby that the line L terminates on a group of terminals (of which the sleeve terminal S is one) in a line switch, which group of terminals is numerically designated as 4000.

In many automatic telephone exchanges, particularly those in which the lines terminate on non-numerical switches of the cross-bar type, for example, there is no correlation between the equipment number termination of a line and the directory number assigned to the station on the line or, if there be more than one station on the line, to the directory numbers of the several stations thereon, except that, in general and for a 10,000 line exchange, the total number of directory numbers is not less than the total of the equipment location numbers. Should there be lines in the exchange that have a plurality of stations thereon, as in the case of line L, for example, some of the equipment terminals in the vertical column of terminals Eqpt. No. Term. would be vacant. It is necessary, however, that each directory number assigned to a station be correlated with the equipment location number of the line to which the station is connected, and since this correlation is purely an arbitrary one, the latter is established by suitable cross-connections between the equipment number terminals and another group of 10,000 cross-connecting terminals which, in Fig. 1, is illustrated by the vertical column of terminals under the legend "Dir. No. Term. (10,000)." Between the equipment number terminals on Eqpt. No. Term. and the directory number terminals on Dir. No. Term. conductors are interposed in accordance with location numbers of the several lines and the assigned directory numbers of the station, or stations, on said lines. Thus, for example, it has been assumed that line L has an equipment location number of 4000. Accordingly, terminal S of the line is extended by a conductor to cross-connecting terminal 4000 in Eqpt. No. Term. Line L, however, is provided with the four stations A, B, C and D of which it has been assumed that station A has the directory number 3847. Accordingly, a conductor is further extended from equipment location terminal 4000 in Eqpt. No. Term. to directory number terminal 3847 Eqpt. No. Term. In the same manner, three other conductors, one for each of the other three stations B, C and D, extend from 4000 in Eqpt. No. Term. to three other directory number terminals in Dir. No. Term. in accordance with the directory numbers severally assigned to the three stations B, C and D. When a line contains but one station, then there would be but one conductor extending between the equipment number terminal in Eqpt. No. Term. and a directory number terminal in Dir. No. Term.

For the purpose of the present invention, a "Termination Network" comprising a capacitor C1 and resistor R1 is connected as shown to each of the occupied directory number terminals, while a branch of the Termination, including resistor R2, is extended to a "class" terminal in the vertical group of terminals beneath the legend "Class" in accordance with the class of service to which the station is entitled. At the common terminal of the capacitor C1 and resistors R1 and R2 of each Termination, a conductor 1, 2, 3 or 4 extends to the primary networks shown in Figs. 2 and 3, in accordance with the directory number indicated by the directory number terminal to which the conductor is connected, as more particularly set forth below.

The wiring arrangement at the equipment number and directory number terminals for the lines of a P. B. X is somewhat similar to that of individual lines and stations thereon, though slightly modified to permit the identification of the one directory number to which a call is to be charged regardless of the line in the group that initiates the call. For this purpose, all the directory number terminals of a P. B. X line group are extended to a Collector Network comprising a resistor R3 for each terminal, connected in parallel to a grounded common resistor R4, whence a conductor 5 further extends into one of the primary networks shown in Figs. 2 and 3 in accordance with the P. B. X directory number to which calls made from any line in the group are to be charged. As further explained below, and shown in the drawing, conductor 5 is connected to a passive element R1100 in primary network PDN-A, thereby indicating that the directory number to which calls made from the lines in the P. B. X group are to be charged to directory number 1100, which is the number identified whenever a line in said P. B. X group originates a call, regardless of its own number.

It is thus evident from the above description that the wiring arrangement indicated in Fig. 1 provides one "identifying" conductor individual to each of the directory numbers of the several stations in the office, and one identifying conductor for all the stations of a P. B. X group. It is further evident that if a source of alternating potential were to be applied to the sleeve conductor SL of the extended connection, a circuit therefor would be completed through each of the Termination networks by way of the equipment number terminal connected to the sleeve S terminal of the line and the Termination networks connected to said equipment number terminal via the directory number terminals. The potential available on each of the four conductors 1, 2, 3 and 4 (by way of example) or, if the call originated on a line of the P. B. X group, the potential available on the one conductor common to the group, may be utilized for purposes of directory number identification. As explained later, the signal power source is the oscillator OS (Fig. 9) which, at the appropriate time, is applied to the sleeve conductor SL of the connection through the contacts of relay SIG (Fig. 1) which is operated by any suitable means at the required time.

Figure 2:
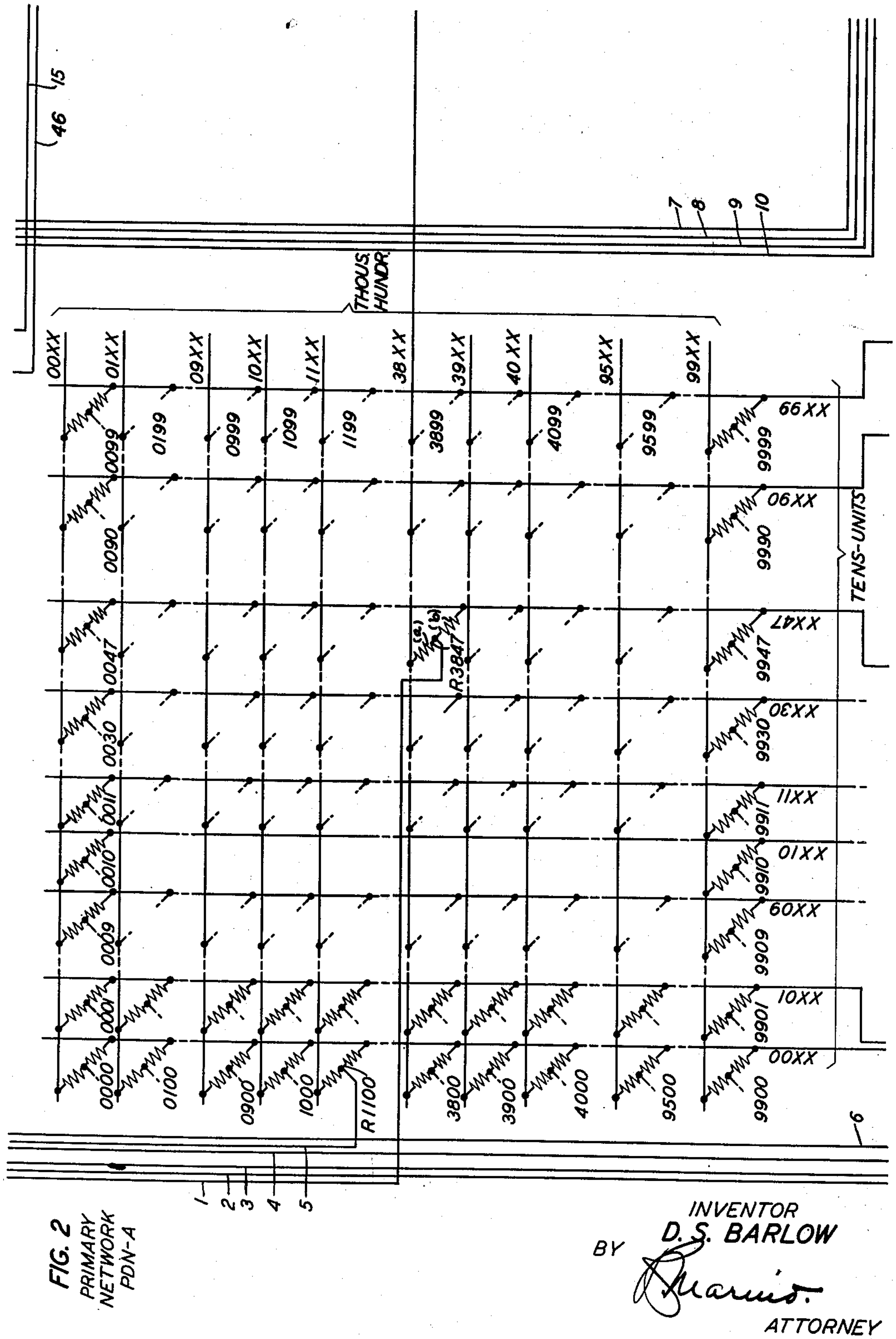
Fig. 2 shows in detail one of the primary networks of passive electrical elements.
Figure 3:
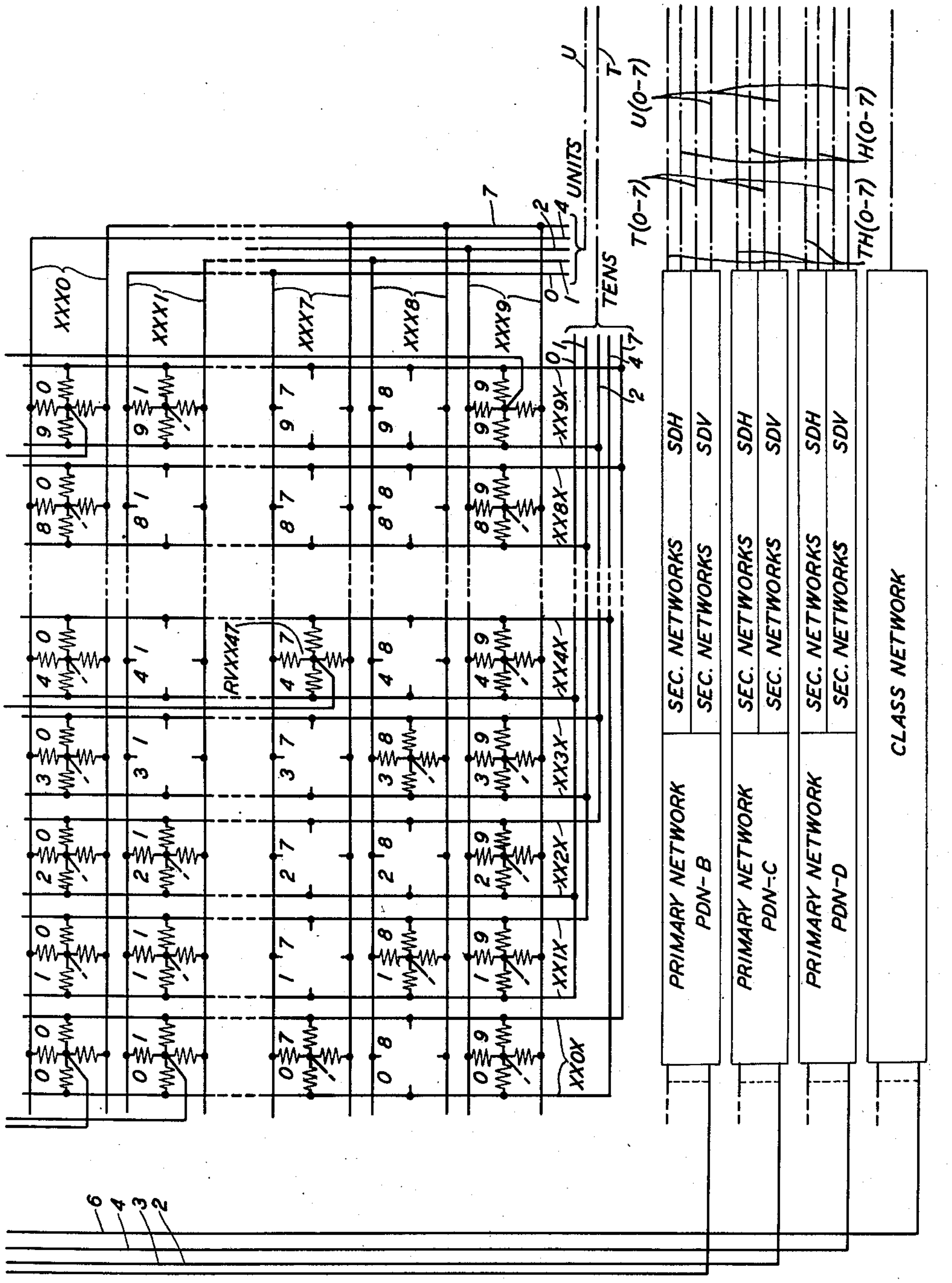
Fig. 3 shows in detail one of the two secondary networks associated with the primary network shown in Fig. 1 (the other being shown in detail in Fig. 4); it also indicates, conventionally, three other primary networks and associated secondary networks and, further, a "class" network.

Fig. 2 shows the detailed arrangement of one of the primary networks PDN–A, the other three (together with their associated pairs of secondary networks) being indicated in the lower portion of Fig. 3. The number of primary networks provided in an exchange depends upon the largest number of stations, not exceeding four in the present embodiment of the invention, which are connected to any one line. It is assumed, therefore, that the four stations A, B, C and D on the line L represent the maximum number of stations on a line, though, of course, there can be less than this number. Accordingly, one primary network and two associated secondary networks are provided for all stations in the exchange corresponding to station A, one network and two associated networks are provided for all stations corresponding to station B, while identical primary and associated pairs of secondary networks are provided for all stations corresponding to station C and station D, respectively. The primary network PDN–A illustrated in Fig. 2 is for all party stations A in the exchange and, also (for convenience), all single stations; primary network PDN–B, indicated in Fig. 3, being for all party stations B; primary network PDN–C being for all party stations C, and primary network PDN–D being for all party stations D. It will be observed that with each primary network PDN there is associated a pair of secondary networks SDV and SDH, of which those associated with the primary network PDN–A are shown in detail in Figs. 3 and 4, respectively.

Each of the primary networks PDN– comprises a network of one hundred linear, bilateral passive electrical elements. By a "linear, bilateral passive electrical element" I mean an element in which the current is linearly affected by the voltage applied across said element, but the intensity of which current is not affected by the polarity of the applied voltage. Thus, for example, a resistor, an inductor or a capacitor, or a network of these elements in combination, is meant to be included within the definition of a linear, bilateral, passive, electrical element. It is understood that in this description and in the claims, the expression "linear, bilateral, passive electrical element" or "passive element" shall mean an element having the properties as above indicated. And by way of illustration, the networks, both primary and secondary, of which use is made in the present invention comprise passive elements made up of resistors as described above and arranged as described below.

Each passive element in a primary network comprises two components (*a*) and (*b*) having a common terminal (see element R3847 in Fig. 2), the outer terminals of which are respectively connected to two conductors in two groups of one hundred conductors each. For purposes of illustration these two groups of conductors are shown in Fig. 2 as disposed in coordinate arrangement, it being understood, of course, that the conductors in each group are insulated from each other and from the conductors in the other group. The conductors in the horizontal group of one hundred conductors are severally designated from 00XX . . . 99XX, while the conductors in the vertical group of one hundred conductors are severally designated XX00 . . . XX99. It is evident from the arrangement that if a passive element is connected to a conductor in the horizontal group which has a particular thousands and hundreds numerical designation, and to a conductor in the vertical group which has a particular tens and units designation, that element will designate a four-digit number composed of the thousands and hundreds digit designation of the horizontal conductor to which the element is connected and the tens and units digit designation of the vertical conductor to which the element is connected. Thus, for example, passive element R3847 has the terminal of its component (*a*) connected to horizontal conductor 38XX and the terminal of its component (*b*) connected to vertical conductor XX47. The passive element R3847, therefore, designates the four-digit number "3847." In the same manner, each passive element RXXXX which is joined to a horizontal conductor and a vertical conductor in a primary network will designate a four-digit number that will be characterized by the two digits of the designation of the horizontal conductor and the two digits of the designation of the vertical conductor. Since the primary network has a capacity for 10,000 numbers, a similar number of passive elements, each suitably connected to a horizontal and vertical conductor as above described, would indicate each of the 10,000 numbers.

From the Termination network of each of the stations the identifying conductor of the station is extended to the common terminal of the two components (*a*) and (*b*) of the appropriate one of a passive element in one of the four primary networks PDN–A, PDN–B, PDN–C and PDN–D in accordance with the directory number of the station. Thus conductor 1, associated with station A having the directory number 3847, joins the Termination network connected to directory number terminal 3847 with the common terminal of passive element R3847 in primary network PDN–A. In the same manner conductor 2, individual to station B, joins the Termination network connected to directory number terminal B with the common terminal of the appropriate passive element in primary network PDN–B, said element being connected to the horizontal conductor having the thousands and hundreds digits designation of the directory number of station B and to the vertical conductor having the hundreds and units designation of said directory number. Similarly, with conductors 3 and 4 for stations C and D, respectively, which are severally connected to appropriate passive elements in primary networks PDN–C and PDN–D. Thus, each station in the office corresponding to station A will have an "identifying conductor," similar to conductor 1, extending between its Termination network and that passive element in the primary network PDN–A which joins a horizontal conductor therein having as part of its designation the thousands and hundreds digits of the directory number, and a vertical conductor therein having as its designation the tens and units digits of said number. Stations in the office corresponding to stations B, C and D similarly have their respective identifying conductors connected to passive elements in primary networks PDN–B, PDN–C and PDN–D.

The identifying conductors pertaining to lines of private branch exchange groups are similarly treated. Where each line of a private branch exchange group is to be charged for its own calls and, therefore, it is necessary to identify its own directory number upon the origination of each of such calls, the identifying conductor of each line in the group is treated like that of any other line in the office: that is, the identifying conductor is connected between the Termination network of the line and a passive element in whichever primary network PDN– is utilized for private branch exchange stations that identifies the directory number of said line. Where, however, calls originating on the lines of a private branch exchange group are to be charged to one line only, or even to an arbitrary directory number, it then becomes necessary to identify the latter number upon the origination of a call from any line in the group. In the latter event, the directory number terminals of the private branch exchange stations are extended to a Collector network comprising a resistor R3 for each station, which is connected in common to a grounded resistor R4, whence an identifying conductor is then extended to a passive element in the appropriate primary network PDN which is individual to the directory number to which all calls in the correlated private branch exchange group are to be charged. In the arrangement shown in Fig. 1, the calls from the private branch exchange lines therein indicated are to be charged to directory number 1100. Accordingly, identifying conductor 5 is connected to passive element R1100 in primary network PDN–A, the latter network having been arbitrarily selected for directory number identification service in respect to lines of the private branch exchange group. It should be noted, however, that an obvious arrangement is possible whereby sets of collector networks may be utilized to cause some P. B. X lines to be charged to their own number, others to a common number, and still others to a third or more common number.

Different lines (or stations) in an exchange are entitled to different classes of service in accordance with contractual agreements between subscribers and the telephone company. It is necessary, therefore, when a subscriber establishes a call to determine the class of service to which he is entitled, along with the determination of his directory number. For this purpose there is provided in the present invention a "Class Network," indicated in Fig. 3, which is similar in arrangement to a primary network PDN. There is also provided a group of "Class" terminals, shown in Fig. 1, to each of which a branch of the Termination network of each station entitled to the same class of service is connected. A class identifying conductor, for example conductor 6, is then used to connect said class terminal with the passive element in the Class network which identifies said class by some digit or character indicative of the class. In this manner, a portion of the signal potential is made available on conductor 6 for the identification of the class of service at the same time that another portion of said signal potential is made available on the station identifying conductors for the determination of the calling station's directory number.

Mention has been made of the fact that if a source of alternating-current potential is applied to the sleeve conductor SL of an extended connection, that potential becomes available on all identifying conductors, for instance conductors 1, 2, 3 and 4 severally connected to the Termination networks of the stations on the line L which forms part of the connection. It should now be evident that with the connection of these identifying conductors severally to passive elements in each of the four primary networks PDN–A . . . PDN–D, said potential is extended in each network to the pair of vertical and horizontal conductors therein to which the passive element is connected. Since the calling station on a line is determined by the operation of one of the four relays A, B, C and D of the party register as previously noted, the potential thus made available at each pair of conductors in each of the primary networks PDN could be used, if desired, to activate suitable responsive apparatus under the control of the operated party register relay to provide an indication of the directory number of the calling station.

One of the features of the present invention is the "compression" of the directory number into a simple code which will permit a small number of code buses, or conductors, to transmit the directory number identification of one out of ten thousand stations. Information in a one-out-of-ten-thousand code is expensive to transmit, register and record, and it is desirable, therefore, to compress the code, though it is obvious that where the invention is practiced in an office that involves a relatively small number of stations, code compression may be avoided and identification may be effected by connecting the responsive devices directly to the primary networks.

Since the directory number is already a base ten code, that code must be the one used in the end result and is, therefore, chosen in this example as the compressed code. The individual base ten digits are put in an "additive" two-out-of-five code in this example to conform to certain types of accounting equipment and to allow checking as hereinafter described. Since the two-out-of-five code requires but five code conductors for each digital order of the directory number, but twenty code conductors (five for each digital order) are required to transmit four digit directory number identification for each one of ten thousand stations.

In the two-out-of-five code, any digital value from 0 to 9 is expressed by the electrical activation of two out of a group of five conductors, or other suitable elements, each of which is given a numerical designation such that, for each digital value except 0, the sum of the designation of the two conductors, or elements, activated to express a digital value, indicates that value. To simplify the description of the invention and to permit the figures of the drawing to be followed more readily other elements which express the code, or are the end-products of the activation of such elements to indicate a particular digital value according to the code, are given the code designation, either as a suffix to a given functional designation of the code conductor or element, or as the sole designation. The code is as follows:

| Digital Value | Code Conductors or other Elements and Their Designation |
|---|---|
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |
| 0 | 4, 7 |

One advantage of the two-out-of-five code chosen in this example is that each digital value is expressed by two elements of the code, and only two, so that if for any particular digit less or more than two elements are activated, such activation will be recognized as an error.

In order to compress the directory numbers into the two-out-of-five code, two secondary networks SDH and SDV of passive linear elements are provided for each primary network PDN–, the one secondary network SDH being used to express the thousands and hundreds digit of the identified number in the two-out-of-five code and the secondary network SDV being used to express the tens and units digits of the number in this code.

Figure 4:
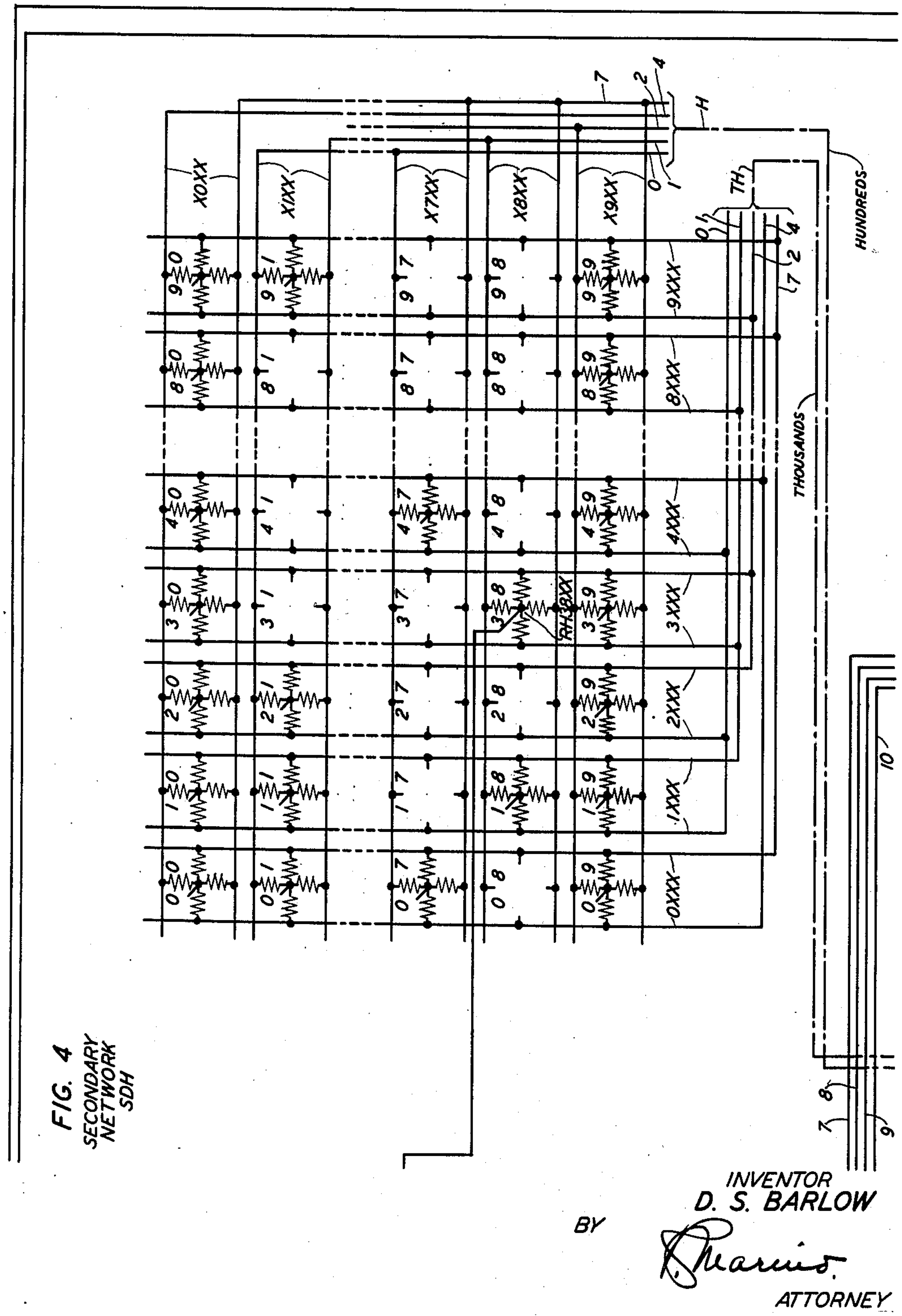

Fig. 4 shows in detail the secondary network SDH associated with the primary network PDN–A, while Fig. 3 shows in detail the secondary network SDV associated with said primary network. It is understood that a similar pair of secondary networks SDH and SDV is provided for each of the other three primary networks PDN–B, PDN–C and PDN–D, as indicated in the lower portion of Fig. 3.

Each secondary network SDH comprises two groups of ten pairs of conductors, one group of ten pairs being shown in Fig. 4 in vertical alignment to indicate the ten values 0XXX . . . 9XXX of the thousands digit, the other group of ten pairs being shown in horizontal alignment to indicate the ten values X0XX . . . X9XX of the hundreds digit.

The two vertical conductors 0XXX, for example, are extended to the two code conductors 4 and 7 of the five code conductors 0, 1, 2, 4 and 7 included within the bracket TH, to indicate the "0" value of the thousands digit, while each of the other pairs of vertical conductors 1XXX . . . 9XXX are similarly extended to the particular two out of the five code conductors within the bracket TH in accordance with the code representation of each of the other nine values of the thousands digit.

In the same manner the two horizontal conductors X0XX, for example, are connected to the two code conductors 4 and 7 within the bracket H to indicate the "0" value of the hundreds digit in the given code, while each of the other pairs of horizontal conductors X1XX . . . X9XX are similarly extended to two out of the five code conductors 0, 1, 2, 4 and 7 in said bracket in accordance with the code representation of each of the ten values of the hundreds digit.

To each pair of vertical conductors 0XXX . . . 9XXX is connected ten pairs of passive linear elements, each pair of said elements having a common terminal, each pair being individual to each directory number having the same thousands digit but a different one of the ten values of the hundreds digit, while to each pair of horizontal conductors X0XX . . . X9XX is connected ten pairs of similar passive elements, each pair of said elements being joined at the common terminal with the pair connected to the horizontally crossing (but insulated) conductors, one pair being individual to each directory number having the same hundreds digit but a different one of the ten values of the thousands digit. For example, passive element RH38XX, comprising four components with a common terminal, has its two "horizontal" components connected to the vertical conductors 3XXX and its two "vertical" components connected to the horizontal conductors X8XX. Element RH38XX, therefore, is individual to all directory numbers having the thousands digit "3" and the hundreds digit "8." It is evident from Fig. 4 that the ten passive elements each having their two horizontal components connected to the pair of vertical conductors 3XXX will each be individual to directory numbers having the thousands digit "3" and that the ten passive elements each having their two vertical components connected to the pair of horizontal conductors X8XX will each be individual to directory numbers having the hundreds digit "8." The same arrangement is followed with respect to each of the other passive elements and each of the other pairs of conductors shown or indicated in the secondary network SDV.

Thus the secondary network SDH forms, so to speak, one hundred squares, each square bounded by the crossing of two of the ten pairs of vertical and horizontal conductors, the enclosure of each square containing a four component passive element RH– whose two horizontally disposed elements are connected to the pair of vertical conductors to designate the thousands digit of a directory number, while its two vertically disposed elements are connected to the pair of horizontal conductors to designate the hundreds digit of a directory number. However, since there are ten horizontally disposed passive elements between the same pair of vertical conductors, it follows that each of said pairs designates a directory number which has the same numerical value for its thousands digit, and since there are ten vertically disposed elements connected to the same pair of horizontal conductors, it further follows that each of said pairs designates a directory number having the same value for its hundreds digit. The ten vertically aligned squares bounded by the pair of conductors 0XXX, for example, designate all directory numbers having "0" for the thousands digit, while the ten horizontal squares bounded by the pair of horizontal conductors X0XX designate all directory numbers having "0" for the hundreds digit.

It also follows that, since each pair of vertical conductors 0XXX . . . 9XXX is connected to a pair of the code conductors 0, 1, 2, 4 and 7 within the bracket TH in accordance with the code representation of each of the ten values of the thousands digit, the electrical activation of any pair of vertical conductors by, say, the application of a potential thereto from the common terminal of the passive element within the square, will result in the electrical activation of the two code conductors to which said pair of vertical conductors is connected, thereby to indicate the thousands digit represented by said pair of vertical conductors.

The same thing is true with respect to the activation of any pair of horizontal conductors X0XX . . . X9XX. The activation of a pair of code conductors 0, 1, 2, 4 and 7 according to the code within the bracket H indicates the particular value of the hundreds digit of the passive element to which the potential is applied. Thus if a potential is applied to the common terminal of the element within a square formed by two vertical and two horizontal conductors, one pair of code conductors 1, 2, 4 and 7 within bracket TH will be activated to indicate the code of the thousands digit value represented by the enclosing pair of vertical conductors, and one pair of code conductors 1, 2, 4 and 7 within the bracket H will be similarly activated to indicate the code of the hundreds digit value represented by the enclosing pair of horizontal conductors. Thus, in the case of the passive element RH38XX, a potential applied to the common terminal thereof will cause the activation of code conductors 1 and 2 within the bracket TH and code conductors 1 and 7 within the bracket H, the former indicating the thousands digit "3" in the two-out-of-five code and the latter indicating the hundreds digit "8" in the same code.

The same arrangement of passive elements is followed in the secondary network SDV shown in Fig. 3, which is reserved for the indication of all tens and units digits of directory numbers to be identified through the primary network PDN–A. In each of the one hundred squares formed by the ten pairs of vertical conductors XX0X . . . XX9X and the ten pairs of horizontal conductors XXX0 . . . XXX9 is connected a four component passive element, for example element RVXX47, the two horizontally disposed components of said element being connected to the pair of vertical conductors XX4X to indicate a directory number having the tens digit "4," and the two vertically disposed components of said element being connected to the pair of horizontal conductors XXX7 to indicate a directory number having the units digit "7." Since the ten pairs of vertical conductors XX0X . . . XX9X are connected to the code conductors 0, 1, 2, 4 and 7 within the bracket T, and the ten pairs of horizontal conductors XXX0 . . . XXX9 are connected to the code conductors 0, 1, 2, 4 and 7 within the bracket U, the application of a potential to the common point of the element RVXX47 will activate code conductors 0 and 4 within bracket T to indicate the tens digit "4" in the two-out-of-five code and will activate code conductors 0 and 7 within the bracket U to indicate the digit "7."

The connection between a primary network PDN– and its two associated secondary networks SDH and SDV is established by (1) extending the horizontal conductors 00XX . . . 99XX of a primary network PDN severally to the common terminals of the passive elements RH– of the associated secondary network SDH in accordance with the identity of the thousands and hundreds numerical designation of the conductors with those of said elements RH– and (2) extending the vertical conductors XX00 . . . XX99 of said primary network PDN severally to the common terminals of the passive elements RV– of the associated secondary network SDV in accordance with the identity of the tens and units numerical designation of the conductors with those of said elements RV–. Considering, for example, the primary network PDN–A and its two associated secondary networks SDH and SDV, horizontal conductor 38XX in said primary network is connected to the common terminal of passive element RH38XX in the secondary network SDH; other horizontal conductors – –XX from said primary network being similarly extended to other passive elements RH– in said secondary network. Similarly, vertical conductor XX47 from primary network PDN–A is connected to the common terminal of passive element RVXX47 in secondary network SDV; other vertical conductors XX– – from said primary network being similarly extended to passive elements RV–.

In view of the described relation between a primary network PDN– and its two associated secondary networks SDH and SDV, it is evident that a signal potential furnished over a horizontal conductor – –XX to the common terminal of a similarly designated passive element RH– –XX in secondary network SDH will furnish code indications of a directory number having the thousands digit value indicated by the thousands digit designation of the pair of vertical conductors in the secondary network SDH to which the two horizontal components of said element are connected, and a hundreds digit value indicated by the hundreds digit designation of the pair of horizontal conductors in said secondary network to which the two vertical components of said element are connected. Similarly, a signal potential applied over a vertical conductor XX– – to the common terminal of a similarly designated element RVXX– – in secondary network SDV will furnish tens and units digit code indications of a directory number having the tens digit value indicated by the tens digit designation of the pair of vertical conductors to which the two horizontal components of said element are connected, and a units digit value indicated by the units digit designation of the pair of horizontal conductors to which the two vertical components of said element are connected.

Figure 5:
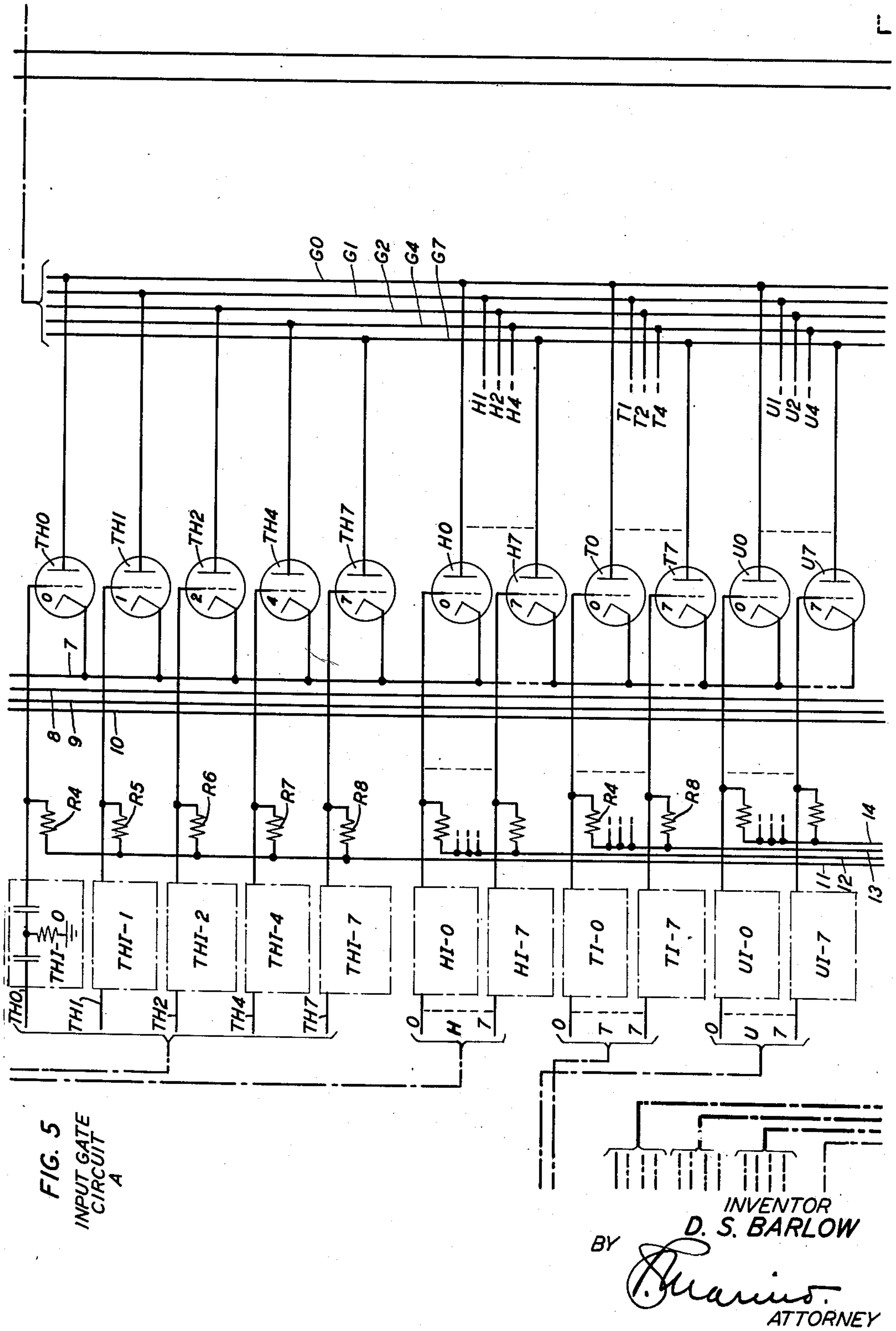
Figs. 5, 6, 7 and 8 show the four input gate circuits, each one associated with one pair of secondary networks.
Figure 6:
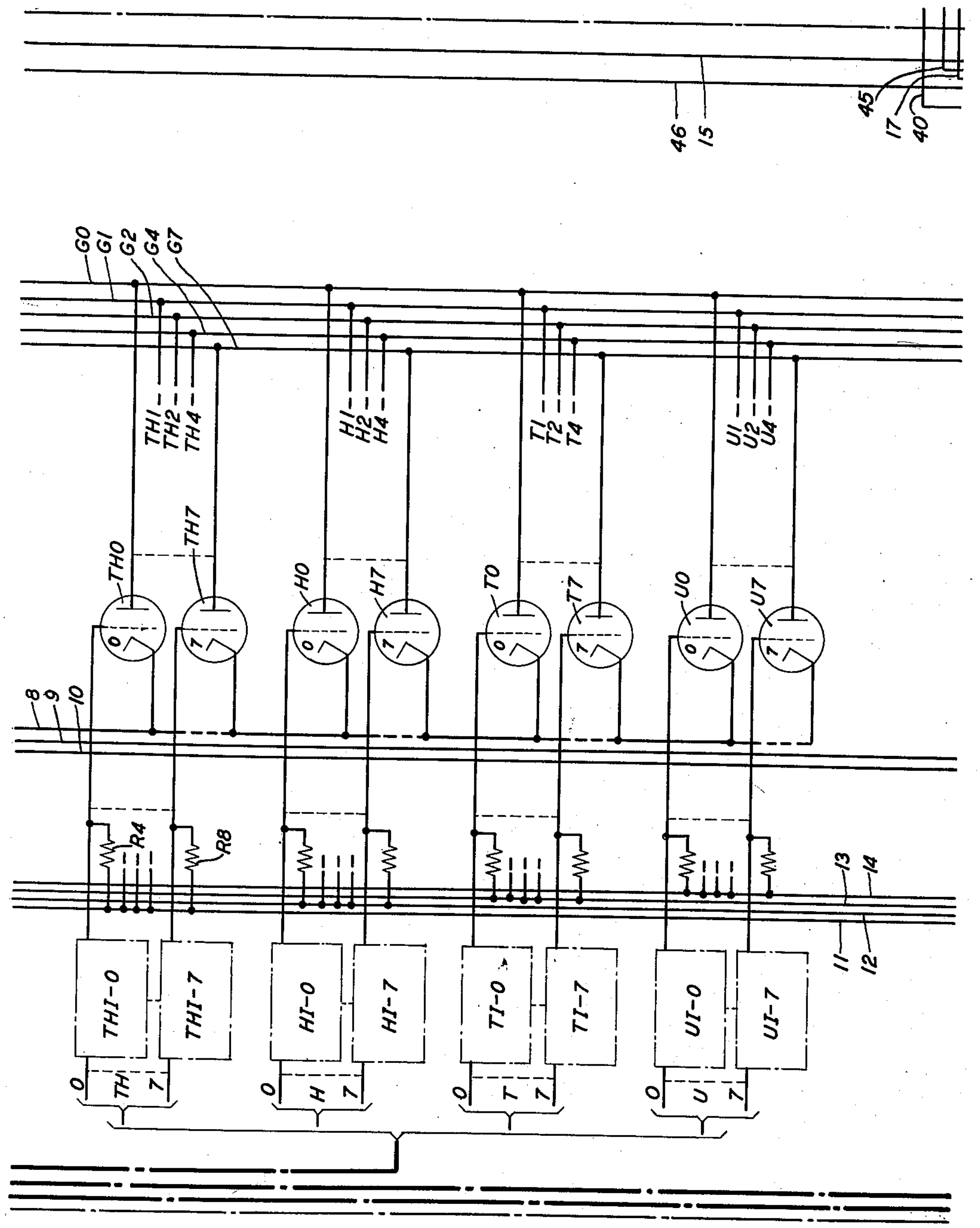
Figure 7:
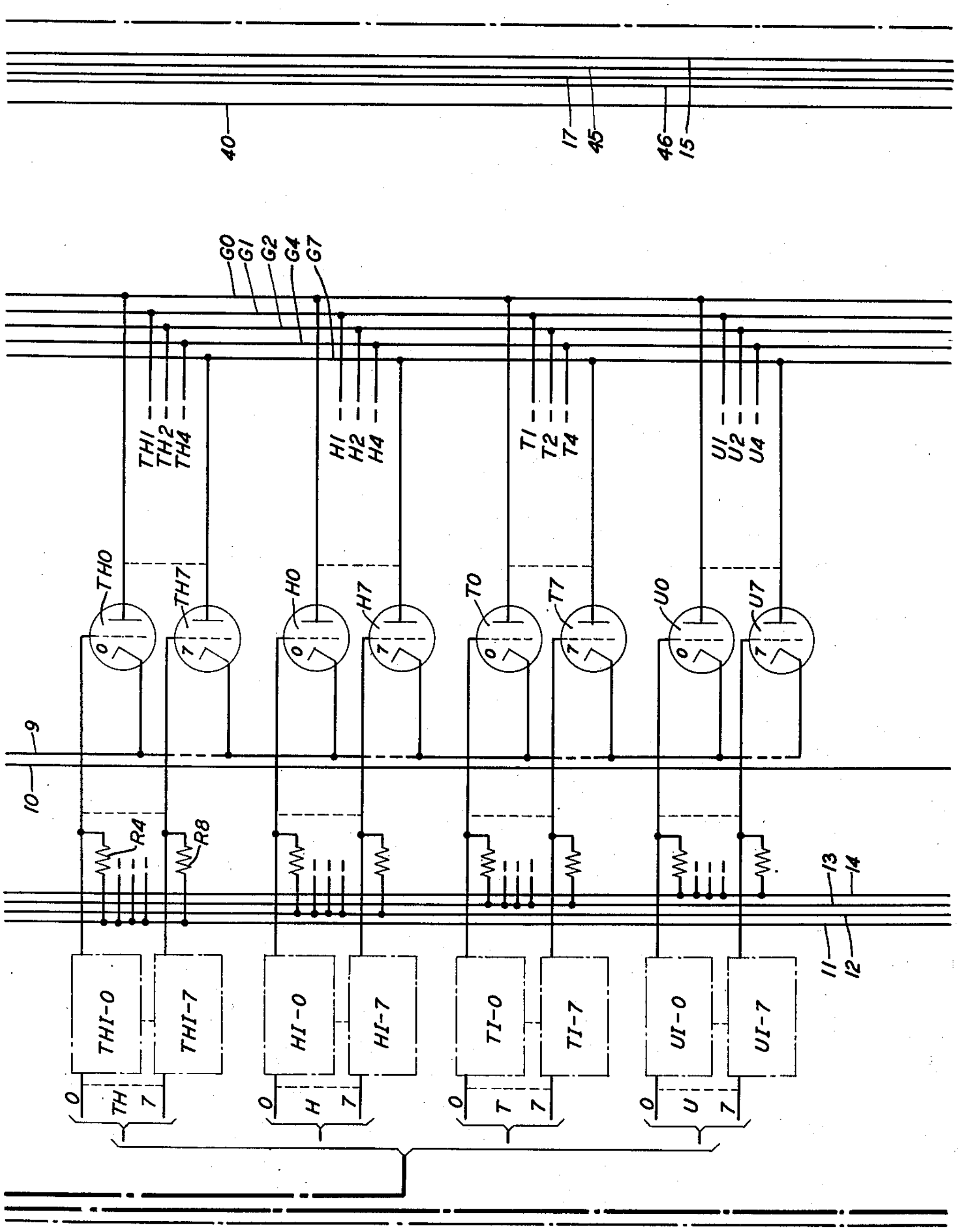

Figs. 5, 6, 7 and 8 show, respectively, the Input Gate circuits for the four network groups, each group consisting of a primary network PDN– and its two associated secondary networks SDH and SDV. Fig. 5, designated "Input Gate Circuit A," shows the input gate circuit for the primary network PDN–A and the two associated secondary networks SDH and SDV; Fig. 6, designated "Input Gate Circuit B," shows the input gate circuit for the primary network PDN–B and its two associated secondary networks SDH and SDV (indicated as a block diagram at the bottom of Fig. 3); Fig. 7, designated "Input Gate Circuit C," shows the input gate circuit for the primary network PDN–C and its two associated secondary networks (also indicated in block diagram at the bottom of Fig. 3); while Fig. 8, designated "Input Gate Circuit D," shows the input gate circuit for primary network PDN–D and its two associated secondary networks (likewise indicated in block diagram at the bottom of Fig. 3). As previously mentioned, there is also included (and indicated in Fig. 3) a "class" network for which a class input gate circuit is provided and indicated at the bottom of Fig. 8, the latter input gate being essentially similar in construction to the other input gate circuits.

Each input gate circuit, for example, the input gate circuit A, comprises four groups of five electronic networks each, each group being reserved for one of the digits of the directory number. Thus there are twenty networks in all for each input gate circuit. Considering as representative the one network in the uppermost group of five networks in Fig. 5, which group is reserved for the thousands digit (only the first group being shown complete, each of the remaining four groups being indicated by the first and last network of the group), each such network comprises an electronic device TH0 and an input impedance THI-0 comprising two condensers and a grounded resistor, the right terminal of one of the condensers being connected to the grid of tube TH0 and the left terminal of the other condenser being connected to the code conductor 0 in the group of such conductors within the bracket TH. The constants of the impedance are so chosen that the impedance network together with resistor R4, for example, constitute a two-stage high-pass filter (the design impedance of the second stage being high compared to that of the first) which permits transmission therethrough of a potential at signal frequency but suppresses all lower frequencies. The anode of the tube TH0 is connected to the code conductor G0, while the anodes of each of the four other tubes TH1, TH2, TH4 and TH7 are respectively connected to the code conductors G1, G2, G4 and G7, said code conductors being extended to all input gate circuits and connected in each gate circuit to the anodes of all tubes therein having the same numerical suffix. Thus conductor G0 is connected to the anodes of tubes TH0, H0, T0 and U0 in all input gates, conductor G1 to the anodes of tubes TH1, H1, T1 and U1, etc. Since the selective activation of two of these code conductors according to the two-out-of-five code will express each of the ten values of a digit, it follows that the five networks TH0, TH1, TH2, TH4 and TH7, when selectively operated to activate two of the code conductors G0 . . . G7 according to the code, will indicate the thousands digit of a directory number. The five similar networks H0 . . . H7 provided for the hundreds digit, the networks T0 . . . T7 provided for the tens digit and the networks U0 . . . U7 provided for the units digit, similarly indicating the corresponding values of such digits when said groups of networks are operated according to the code to activate said conductors. Each of the four input gate circuits A, B, C and D are similarly equipped and arranged. As will be shown later, only the tubes of one particular digital group in only one of the input gate circuits can be rendered conductive at one time to express a digital value, the order of operation in a particular input gate circuit being first the activation of the thousands digit networks TH0 . . . TH7 followed by the hundreds digit networks H0 . . . H7, then the tens networks T0 . . . T7 and last the units networks U0 . . . U7.

The resistors R4 . . . R8 connected, respectively, to the input impedances THI-0 . . . Th-7 of the thousands digit networks TH0 . . . TH7 of input gate circuit A, and similar resistors similarly connected to the input impedances THI-0 . . . TH7 of the thousands digit networks TH0 . . . TH7 in each of the other input gate circuits are connected together and extended by conductor 11 to the cathode of the tube THSL in Fig. 9. Corresponding resistors (shown but not designated) for the hundreds digit circuit networks H0 . . . H7 in each of the input gate circuits are similarly connected together and extended by a conductor 12 to the cathode of the pentode tube HSL. In the same manner, the resistors R4 . . . R8 for the tens digit circuit networks T0 . . . T7 in each of the input gate circuits, and those of the units digit circuit networks U0 . . . U7 in each of the input gate circuits, are extended over conductors 13 and 14, respectively, to the cathodes of the tubes TSL and USL.

It will be further observed that the cathodes of all the twenty tubes TH0 . . . U7 of the input gate circuit A are common to a conductor 7 which extends to the armature of relay A of the party register; that the cathodes of the tubes TH0 . . . U7 of input gate circuit B are common to conductor 8 which extends to the armature of relay B; that the cathodes of the tubes TH0 . . . U7 of the input gate circuit C are common to conductor 9 which extends to the armature of relay C, and that the cathodes of the tubes TH0 . . . U7 of the input gate circuit D are common to conductor 10 which extends to the armature of relay D. Thus the cathodes of the numerical tubes in each input gate circuit are placed under the control of that relay of the trunk party register whose designation corresponds to that of the input gate circuit in which such tubes appear, and it is evident that the activation of the numerical tubes in any particular gate circuit will depend upon which of the four relays A, B, C or D of the trunk party register operates in response to circuit SIC determining which of the stations on a line has originated the call. It will be noted that when relays A, B, C and D are in the non-operated condition, conductors 7, 8, 9 and 10 are at positive battery potential through resistors R60, R61, R62 and R63, respectively, the purpose being to cut off their respective gate tubes by control of their cathodes.

Figure 11:
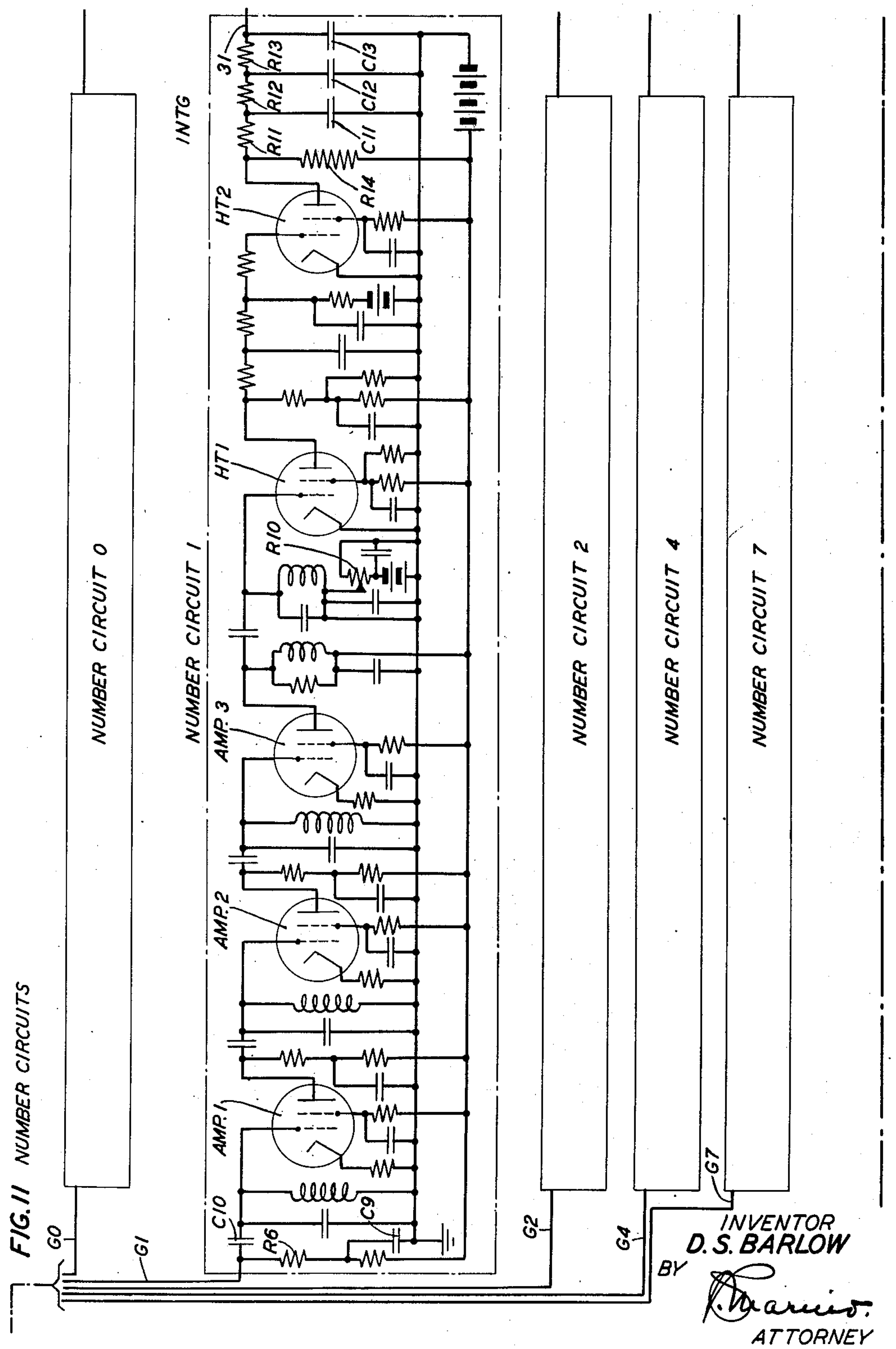
Fig. 11 shows the five Number circuits of which Number Circuit No. 1 is shown in detail and the other four are indicated schematically.

The five code conductors G0, G1, G2, G4 and G7 which, as said above, are connected to the anodes of all input gate tubes having the same numerical suffix, are extended to the five Number Circuits 0, 1, 2, 4 and 7 in Fig. 11, and in which figure Number Circuit 1 is shown in detail, while the remaining four are indicated as rectangles. For example, the anodes of tubes TH1, H1, T1 and U1 in each of the input gates A, B, C and D are connected together and to the code conductor G1 which extends, in turn, to the input side of Number Circuit 1 in Fig. 11. Similar connections extend over conductors G0, G2, G4 and G7 between other corresponding code element tubes in each of the four incoming gate circuits to the other four Number Circuits 1, 2, 4 and 7, respectively. Thus the five Number Circuits shown in Fig. 11 are used in common by the four incoming gate circuits A, B, C and D.

Briefly, the object of each input gate is to respond to the identifying signal expressed by the signal potential applied to two of the five code conductors 0, 1, 2, 4 and 7 in each of the brackets TH, H, T and U if the identity of the directory number of the calling station is to be determined through the primary network PDN— with which a particular gate circuit is assocated through its connection to the two secondary networks SDH and SDV of said primary network. Thus if the identifying conductor of a station, for example, conductor 1 of station A, is connected to a passive element in primary network PDN-A (which is the fact for this particular station since conductor 1 is connected to passive element R3347), then, when this station initiates a call, it will be shown that identifying signal potential will be applied to two code conductors in each of the brackets TH, H, T and U of secondary networks SDH and SDV associated with primary network PDN-A. Under this condition (but under control of other conditions as well) input gate circuit A will respond to said signal potential and cause the sequential activation of two tubes in each group of its digital networks TH0 . . . TH7—U0 . . . U7, whose outputs as a potential on the anode of each of the activated tubes are sequentially applied in groups of two to the code conductors G0, G1, G2 and G7 and, thereover, to the Number circuits, which are operated thereby in a sequence of two at a time to perform certain functions that will be later described.

Mention has been made of the fact that when a party station calls, for example station A which is assumed to have a directory number 3847, a signal comprising a source of alternating potential is applied over the sleeve SL of the connection, and that this potential is then transmitted over a circuit including the Termination impedance C1—R1 of which one is connected to each occupied directory number terminal. The potential derived from this circuit at the common terminal of capacitor C1 and resistor R1 of each of the Terminations T is applied in this particular example to identifying conductors 1, 2, 3 and 4, of which conductor 1 is individual to the calling station A and conductors 2, 3 and 4 are, respectively, individual to stations B, C and D on the same line. Since these conductors are connected to passage elements in the several primary networks PDN-, and said passive elements are further extended to similar elements RH- and RV- in the associated secondary networks SDH and SDV, it follows that a portion of said potential becomes available on two of the code conductors 0, 1, 2, 4 and 7 in each of the brackets TH, H, T and U in each of said secondary networks. This means that, although the directory number of station A only is to be identified through the primary network PDN-A and the associated secondary networks SDH and SDV, the identifying signal potential is not only applied through conductor 1 to the primary network PDN-A, but also to the other three networks PDN-B, PDN-C and PDN-D over conductors 2, 3 and 4, respectively. The consequence is that the signal potential is transmitted to each of the four primary networks and, through them, to their respective secondary networks SDH and SDV, there to become available on two of the code conductors 0 . . . 7 within each of the brackets TH, H, T and U. Since the grids of the tubes TH0 . . . U7 in each of the input gate circuits A, B, C and D are severally connected to the code conductors in the brackets TH, H, T and U of the two secondary networks SDH and SDV associated with each of the primary networks PDN-, it further follows that the signal potential on the identifying conductors, for instance, conductors 1, 2, 3 and 4, is applied to the grids of two tubes in each group of tubes TH0 . . . U7 in each of the input gate circuits A, B, C and D. However, since it is desired to obtain an indication of the directory number of the calling station A only and not of any other station, or stations, on the same line, and since conductor 1 individual to this station is connected to passive element R3847 in primary network PDN-A, only the tubes in the groups of tubes TH0 . . . U7 of input gate circuit A should be activated in the particular example, in response to the identifying potential available on certain of the code conductors within brackets TH, H, T and U of the secondary networks SDH and SDV associated with primary network PDN-A, even though said potential is also applied to similar tubes in each of the other three input gate circuits.

The selection of the particular input gate for response to the identifying potential available on certain code conductors within brackets TH, H, T and U of each pair of secondary networks associated with each of the primary networks PDN-A . . . PDN-D is, as previously indicated, accomplished by the relays A, B, C and D of the party register in the trunk. As previously stated, when station A initiates a call, the station identification circuit SIC operates to determine the identity of the station, and to cause the registration of such identity by the operation of relay A of the party register, which locks to off-normal ground. Since the armature of relay A is extended by conductor 7 to the cathodes of all the tubes TH0 . . . U7 of input gate circuit A, the operation of said relay grounds conductor 7, thereby to apply ground to said cathodes, condition the tubes thereof for operation under the control of the potential on their respective grids, and permit the modulation of the resulting space current by the signal potential which is applied to the grids of two tubes in each group of five from the two code conductors 0, 1, 2, 4 and 7 in each of the brackets TH, H, T and U, if said grids are positive at the time by a positive potential applied thereto over resistors R4 . . . R8, as explained below. Although the same signal potential is applied at the same time to the grids of tubes TH0 . . . U7 in each of the other three input gate circuits B, C, D, said tubes will have a positive potential applied to their respective cathodes through resistors R61, R62 and R63 since relays B, C and D of the party register will not be operated.

Figure 8:
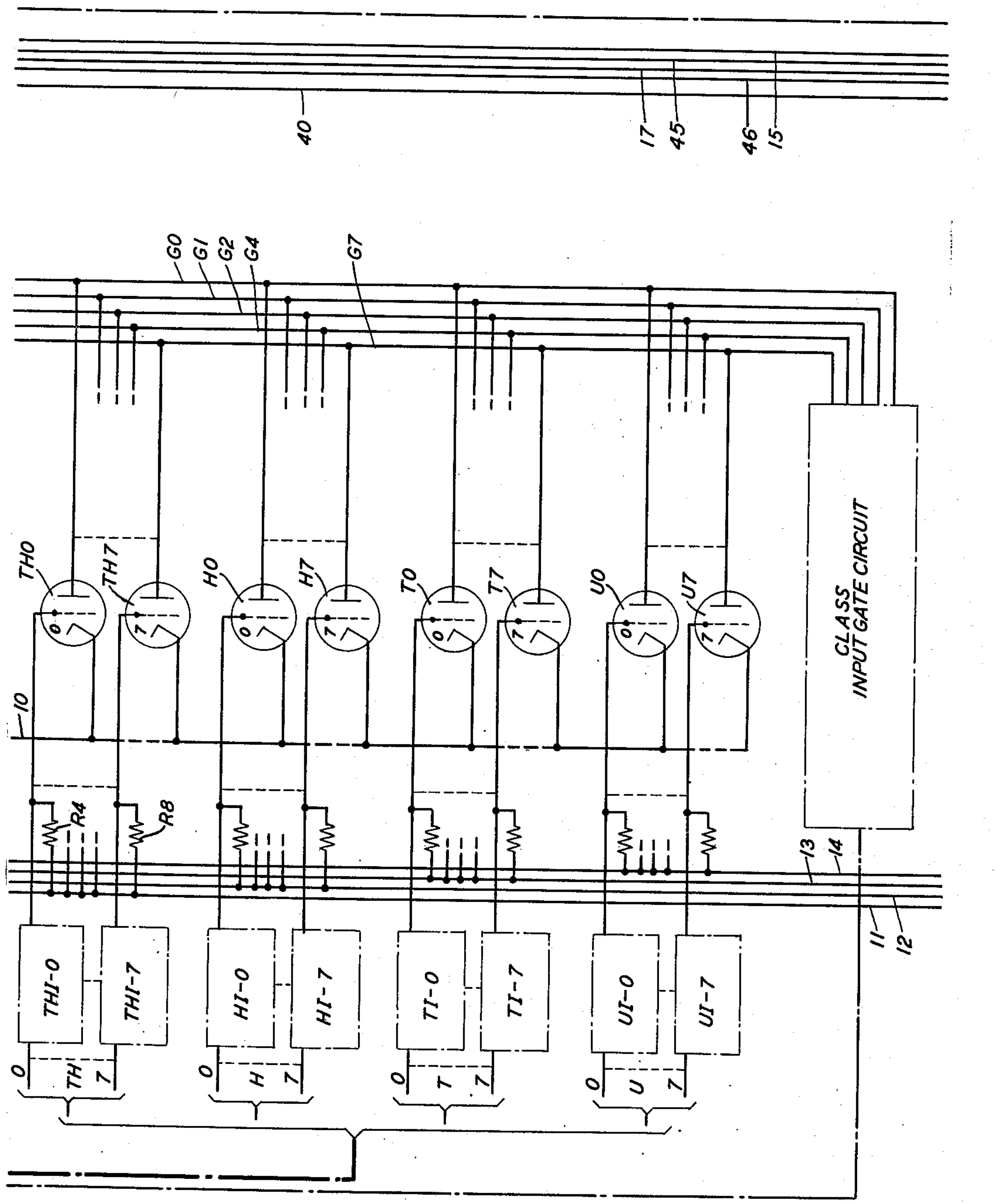

It is obvious from the above that if station B is calling, relay B of the party register will be operated, thereby to cause ground to be applied over conductor 8 to the cathodes of tubes TH0 . . . U7 of input gate B. Similarly, with station C when calling, for which station circuit SIC causes the operation of relay C, the grounding of conductor 9 and the application of ground over said conductor to the cathodes of tubes TH0 . . . U7 of input gate circuit C, and for station D when calling, for which station circuit SIC causes the operation of relay D, the grounding of conductor 10 and the application of ground over said conductor to the cathodes of tubes TH0 . . . U7 of input gate circuit D. The "class" input gate circuit, indicated on the bottom of Fig. 8, is controlled on the same principle and by the same method and need not be further described.

Figure 9:
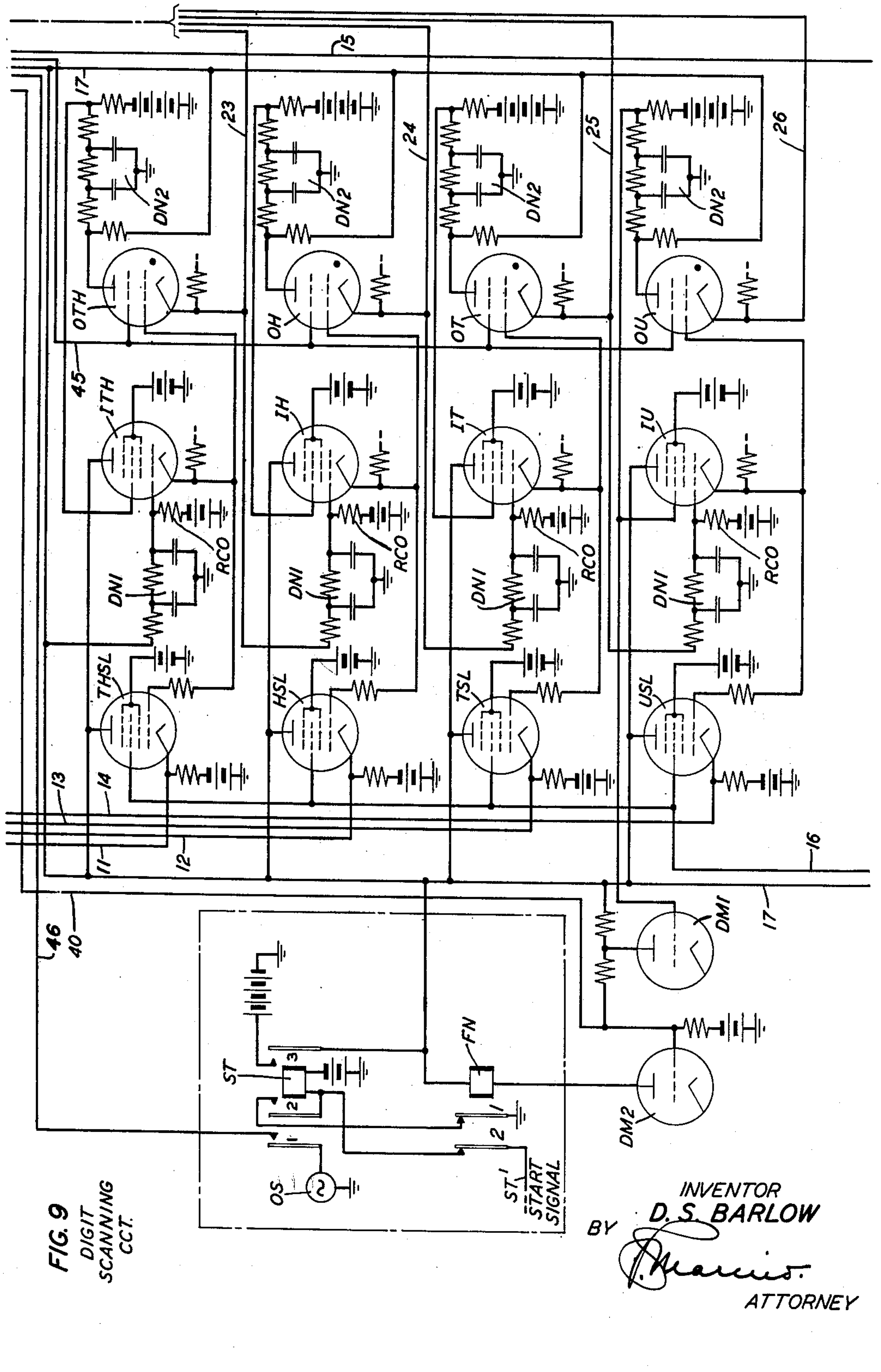
Fig. 9 shows the Digit Scanning circuit.

Once the response of a particular one of the four input gates is determined by the operation in the party register of the relay A, B, C or D which corresponds to the station that initiated the call as above pointed out, the activation of the groups of numerical tubes in the chosen incoming gate circuit is made contingent upon a check of the impedance of the sleeve conductor SL, which impedance must measure within certain predetermined values before the groups of numerical tubes in the determined incoming gate circuit will be activated for response to the signal potential present on certain of the code conductors within brackets TH, H, T and U. To measure the impedance of the sleeve conductor SL, the Sleeve Impedance check circuit shown in Fig. 10 and the four tubes THSL, HSL, TSL and USL with positively biased screens shown in Fig. 9, are provided. Briefly, when the current from oscillator OS is applied over conductor 46 to the sleeve conductor SL (after relay SIG has been operated in any suitable manner) the signal potential at register R9 from said oscillator is applied over conductor 15 to the grid of tube A1. The value of the potential at resistor R9 will depend, of course, upon the impedance of the sleeve conductor. For instance, if said sleeve conductor is grounded because of a trouble condition, the impedance will be low; on the other hand, if the conductor is connected through a high resistance to ground, the impedance will be high. The resulting potential, whether high, low or within permissible limits, is applied (as said before) to the grid of tube A1 over conductor 15. In a manner to be described later, the circuit of Fig. 10 operates, on the application of this potential to the grid of tube A1, to effect the response of inverter tube IN2, the anode circuit of which is connected by conductor 16 to the second control grids of each of the tubes THSL, HSL, TSL and USL. If the impedance of the sleeve conductor is outside of its predetermined limits, tube IN2, which is made non-conducting upon the seizure of the identifier, will be rendered conducting. The consequent drop in its anode potential is applied to the second control grids of each of tubes THSL, HSL, TSL and USL, preventing each of these tubes from operating sequentially at the time each of them would otherwise operate in consequence of a positive potential applied to its first grid by the Digit Scanning Circuit (Fig. 9), as will be shown. Since the cathode of tube THSL is connected to a negative bias as shown and, over conductor 11 and resistors R4 . . . R8, is further connected to the grids of the five tubes TH0 . . . TH7 for the thousands digit in each of the input gate circuits, and since the cathodes of each of the tubes HSL, TSL and USL are similarly connected to negative biases and, over conductors 12, 13 and 14 and resistors similar to resistors R4 . . . R8, are connected, respectively, to the cathodes of tubes H0 . . . H7 of the hundreds digit, to the cathodes of tubes T0 . . . T7 of the tens digit and to the cathodes of tubes U0 . . . U7 of the units digit in each of the input gate circuits, it follows that if tube THSL is non-conducting when two of the thousands digit tubes TH0 . . . TH7 of an input gate circuit (for example, input gate circuit A) have signal potentials selectively applied to their grids from two code conductors within bracket TH, said TH0 . . . TH7 tubes, being cut off, will be ineffective to transmit the signal potential; the same thing being true for the hundreds digit tubes H0 . . . H7, the tens digit tubes T0 . . . T7 and the units digit tubes U0 . . . U7 if tubes HSL, TSL and USL are not rendered conducting by the non-conductivity of tube IN2 to apply positive potential to grids of said digital tubes. On the other hand, if the value of the sleeve impedance measures within predetermined limits as indicated by the value of the potential applied to the grid of tube A1, the operation of the Sleeve Check circuit in response to the activation of tube A1, will cause inverter tube IN2 to remain non-conducting. The potential on conductor 16 will then be relatively positive and tubes THSL . . . USL will be rendered conducting in a sequential order by the positive potential sequentially applied to the first grids thereof by the Digit Scanning Circuit. Since the cathodes of each of the tubes THSL . . . USL will be drawing current at the time each of them is activated, the potential on conductors 11 . . . 14 will be less negative, causing the grids of tubes TH0 . . . U7 (in input gate circuit A whose cathodes were activated by ground on conductor 7) likewise to be rendered less negative, thereby to render said tubes conducting. The signal potential applied to the grids of two of the tubes will then be effective to modulate the space current therethrough in accordance with the frequency of said signal potential which, as explained below, will be transmitted to the corresponding two of the Number Circuits. In the same manner, as each of the tubes HSL, TSL and USL is rendered conducting in the order indicated, the hundreds digit tubes H0 . . . H7, the tens digit tubes T0 . . . T7 and the units digit tubes U0 . . . U7, are enabled, those of the higher digital order being quenched by the quenching (as will be explained) of the companion tube THSL, for example, before the tube HSL of the next digit is activated. In order words, the selected input gate circuit will respond to the identifying signal present on the grids of its tubes if, and only if, the impedance of the sleeve conductor SL, as determined by the operation of the Sleeve Check circuit, is of the correct value. If it is not, the selected input gate "will not open" to transmit the identifying signals to the Number Circuits.

Fig. 9, in addition to showing the four sleeve check tubes THSL . . . USL, also shows the Digit Scan circuit. As previously mentioned, five Number Circuits are provided to receive in succession the two-out-of-five identifying signals from each group of tubes TH0 . . . TH7, H0 . . . H7, T0 . . . T7 and U0 . . . U7 of the activated incoming gate, one Number Circuit being provided for each of the five elements of the two-out-of-five code. These Number Circuits are selectively operated on a two-out-of-five basis in accordance with the code to express each digit of the identified directory number in that code, thus making it necessary to operate these circuits repetitively for each of the four digits and also the "class" digit.

The reason for this operation is, as said before, that one group of five Number Circuits is provided in common for the use of all four digits of the number and the additional "class" digit. If one group of such Number Circuits were to be provided for each digit, then all the groups of such circuits could be simultaneously and selectively operated in response to the activated tubes TH0 . . . U7 of the selected incoming gate. However, the operation of the system as a whole is so rapid that one group of Number Circuits electronically switched in succession to each group of digital tubes of the activated incoming gate suffices for the operation of the system.

Figure 12:
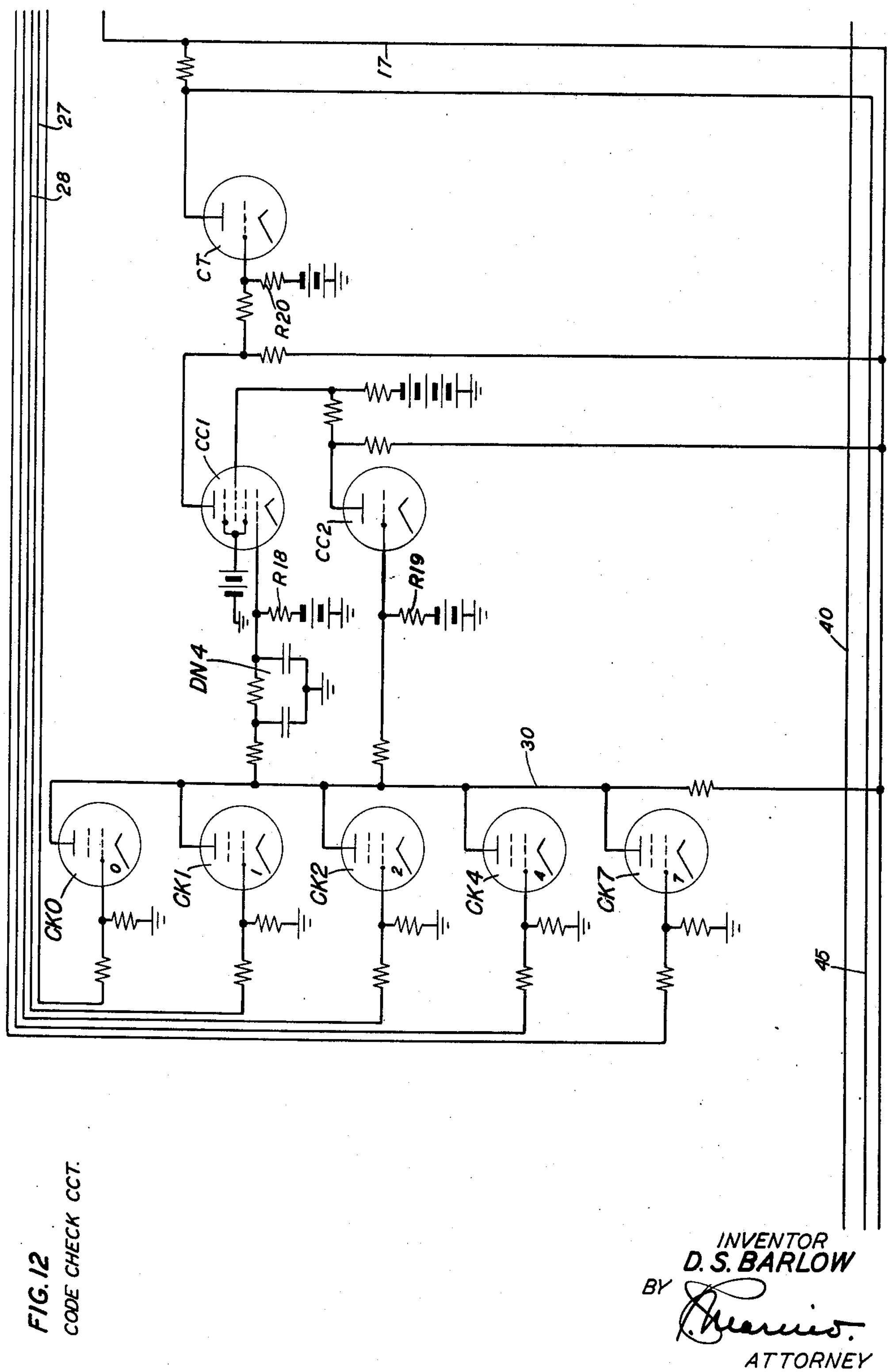
Fig. 12 shows the Code Check circuit.

In order that the group of five Number Circuits 0 . . . 7 of Fig. 11 shall be operated in succession with each group of tubes TH0 . . . TH7; H0 . . . H7; T0 . . . T7 and U0 . . . U7 of the selected incoming gate circuit, the Digit Scanning Circuit shown in Fig. 9 is provided. This circuit comprises, for the four digits of the directory number, four pairs of electronic devices OTH, ITH, OH, IH; OT, IT, and OU, IU, of which the devices OTH, OH, OT and OU are gas-filled tubes, while the devices ITH, IH, IT and IU are vacuum tubes having two control grids. Each pair of tubes is interwired as shown with a pair of "delay" networks DN1 and DN2 and with the first grid of one of the sleeve check tubes THSL . . . USL. In the operation of the identifier, the starting signal is provided by positive battery on the battery supply conductor 17, which applies anode battery to all tubes of the identifier, and, also, to the grid of tube ITH after a delay determined by the constants of delay network DN1. Since the second grid of tube ITH has positive potential applied thereto from the anode of non-conducting tube OTH, application of positive potential to the first grid of tube ITH causes said tube ITH to be rendered conducting to, in turn, render tube THSL conducting if the second control grid thereof has been rendered positive by the application of positive potential on conductor 16 consequent to a satisfactory check of the sleeve impedance by the Sleeve Check circuit of Fig. 10, as previously mentioned. The conductivity of tube ITH and the rise in the positive potential of its cathode (which is biased negatively by the indicated network connected to a negative source of potential, an arrangement also provided for the cathodes of the corresponding three tubes IH, IT and IU) causes enabling potential to be applied to the first grid of its companion tube OTH. The latter tube, however, remains indifferent to the application of this potential to its first grid because at this time and for reasons that will later appear, tube CT of the Code Check circuit shown in Fig. 12 is in a normally activated condition, which results in the application of a negative potential on conductor 45, connected to the second grid of each of the four tubes OTH, OH, OT and OU. Tube OTH, therefore, will remain unresponsive to the positive potential applied to its first grid from the cathode of tube ITH, and will remain unresponsive until the potential on conductor 45 changes from a negative value to a positive value.

As a result of the conductivity of tube THSL, the grids of the thousands tubes TH0 . . . TH7 in each of the incoming gate circuits are rendered positive, as previously stated, and since the two identifying potentials of the thousands digit of the directory number are applied, in the present example, to the grids of the two tubes in the group of tubes TH0 . . . TH7 of incoming gate circuit A in accordance with the code representation of the thousands digit of the number, said potentials modulate the current passing through said two tubes in accordance with the frequency of said potential. Specifically, the thousands digit of the directory number of station A is "3"; accordingly, signal potential is present on the grids of tubes TH1 and TH2 of input gate circuit A, transmitted thereto over code conductors 1 and 2 within bracket TH and the impedances TH-1 and TH-2, respectively. Since the anodes of these digital tubes are connected to positive battery in the correspondingly numbered Number Circuits 1 and 2 over the code conductors G1 and G2, respectively, the current passing through the space of the tubes is modulated in accordance with the frequency of said signal potential, thereby to cause the operation of Number Circuits 1 and 2 in a manner later to be described. In a manner also later to be described, the operation of Number Circuits 1 and 2 in response to the modulation of the current in tubes TH1 and TH2 by the frequency of the signal potential, will result in the operation of tubes AG1 and AG2 in the Output circuit shown in Fig. 13 to, in turn, suppress the operation of the normally conducting companion inverter tubes IG1 and IG2 which, over conductors 19 and 20, respectively, apply positive potential to the grids of the gas-filled digit register tubes OTH1, OTH2, OH1, OH2, OT1, OT2 and OU1, OU2 of the digit register circuit shown in Fig. 13. The operation of these tubes as well as all other tubes of the digit registers is, however, conditioned upon the application of positive potential to their respective second grids. Normally these grids are negatively biased by negative potential connected to the cathodes of tubes OTH . . . OU of the Digit Scan circuit, the second grids of the tubes OTH0 . . . OTH1 of the thousands digit register having biasing potential applied to their second grids over conductor 23, those of the hundreds tubes OH0 . . . OH1 receiving biasing potential over conductor 24, while those of the tens and units digit register tubes OT0 . . . OT7 and OU0 . . . OU7 receive biasing potential over conductors 25 and 26, respectively.

Before the two operated Number Circuits are caused to operate the two tubes of the appropriate digit register, to register therein the digit of the directory number, and the Digit Scan circuit allowed to progress to the activation of the tubes of the next digit in the operated input gate, it is desirable to check that two, and only two, Number Circuits have been operated in response to identifying potential from the digital tubes of the operated incoming gate. The enablement of the tubes of the digit register by the control of the potential on their respective second grids is, therefore, made dependent upon this check, which means that the potential on their respective second grids is changed from negative to positive only in the event that two, and only two, Number Circuits have been operated.

To make this check, the Code Check circuit shown in Fig. 12 is provided. It will be seen from an inspection of Figs. 13 and 12 that the anodes of the output circuit tubes AG0 . . . AG7 are connected to the grids of the check tubes CK0 . . . CK7 as well as to the grids of the inverter tubes IG0 . . . IG7. When two of the tubes AG0 . . . AG7 are operated as previously indicated, two of the check tubes CK1 . . . CK7 are also operated. It will be shown that tube CT is normally conducting, in consequence of which (and as previously mentioned) the potential on conductor 45 is normally relatively negative to prevent tube OTH of the Digit Scan circuit from operating on the enabling potential applied to its first grid from the cathode of tube ITH, as a result of the latter's conductivity, upon the seizure of the circuit in response to the application of positive potential on conductor 17. If, however, but two of the check tubes CK0 . . . CK7 operate, the effect will be to arrest the conductivity of tube CT, raise the anode potential thereof to positive and cause said potential then to be applied over conductor 45 to the second grids of the tubes OTH . . . OU of the Digit Scan circuit. Since tube OTH has had enabling potential previously applied to the first grid thereof by the operation of tube ITH, tube OTH is thereby rendered conducting, causing the biasing potential on conductor 23 to change from negative to positive and thereby enable the tubes OTH0 . . . OTH7 of the thousands digit register. Tubes OTH1 and OTH2 are then rendered conducting to register the thousands digit "3." Tube OTH, once operated, will remain operated (since it is a gas tube) until the cathode-anode circuit is opened, in this case by the disconnection of positive battery from conductor 17.

However, if less than two or more than two Number Circuits operate in response to, say, the operation of less or more than of the digit tubes TH0 . . . TH1, then a corresponding number of check tubes CK0 . . . CK1 will be operated. Under these conditions, tube CT will remain conducting, the negative potential on conductor 45 will remain unchanged and tube OTH will remain cut off, thereby to prevent any further operation of the Digit Scan circuit and the registration of any digit in the thousands digit register of the output circuit. Thus, the Digit Scan circuit proceeds with succeeding scanning operations only upon signal, given by the operation of tube OTH for the thousands digit, that two, and only two, Number Circuits have been operated.

The conductivity of tube OTH renders its anode potential relatively negative, and because said anode is connected to the second control grid of tube ITH via delay network DN2, will cause the quenching of the latter tube after the lapse of a time interval and the removal of positive potential from the grid of tube THSL which thereby quenches, the latter again applying negative bias at its cathode to conductor 11 and, therefore, to the grids of the thousands digit tubes TH0 . . . TH7 in all incoming gate circuits, quenching said tubes and preventing further operation of the two Number Circuits which operated in response to the two tubes in the group of tubes TH0 . . . TH7 of incoming gate circuit A to the grids of which identifying signal potential was applied.

The conductivity of tube OTH further causes positive potential on its cathode to be applied to the grid of tube IH through the network DN1. After a delay determined by the constants of this network, tube IH is rendered conducting to function in the same manner as tube ITH, in consequence of which the cycle of scanning is repeated for the hundreds digit, thereby to cause the identifying signal potential for said hundreds digit to be effective on the grids of two tubes H0 . . . H7 in the appropriate incoming gate circuit (in this case, incoming gate circuit A) over the code conductors 0, 1, 2, 4 and 7 within bracket H of secondary networks SDH. Tubes H1 and H7 (for the hundreds digit 8) of incoming gate circuit A are activated to cause the operation of Number Circuits 1 and 7 and the consequent operation thereby of register tubes OH1 and OH7 of the hundreds digit register under the control of the Digit Scan Circuit and the Code Check circuit as previously indicated for the thousands digit. The third cycle, initiated by the operation of tube IT in the same manner as the second cycle was initiated by the operation of tube IH, will result in the operation of Number Circuits 0 and 4 (for the tens digit 4) and the subsequent operation of register tubes OT0 and OT4 of the tens digit register, while the fourth cycle, initiated by the operation of tube IU, will result in the operation of Number Circuits 0 and 7 (for the units digit 7) and the subsequent operation of tubes OU0 and OU7 in the units digit register.

Figure 13:
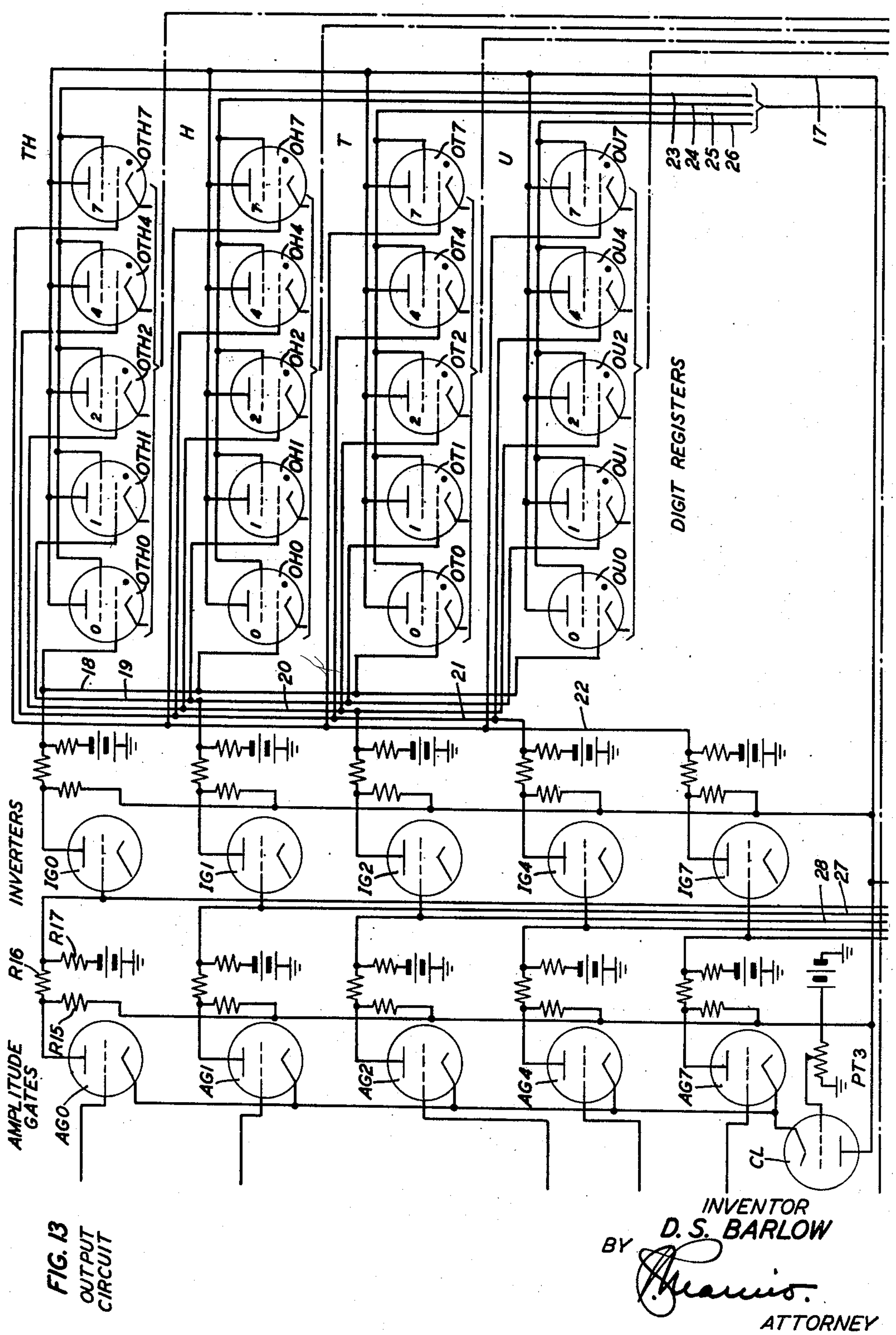
Fig. 13 shows the Output circuit, including the digit registers.
Figure 14:
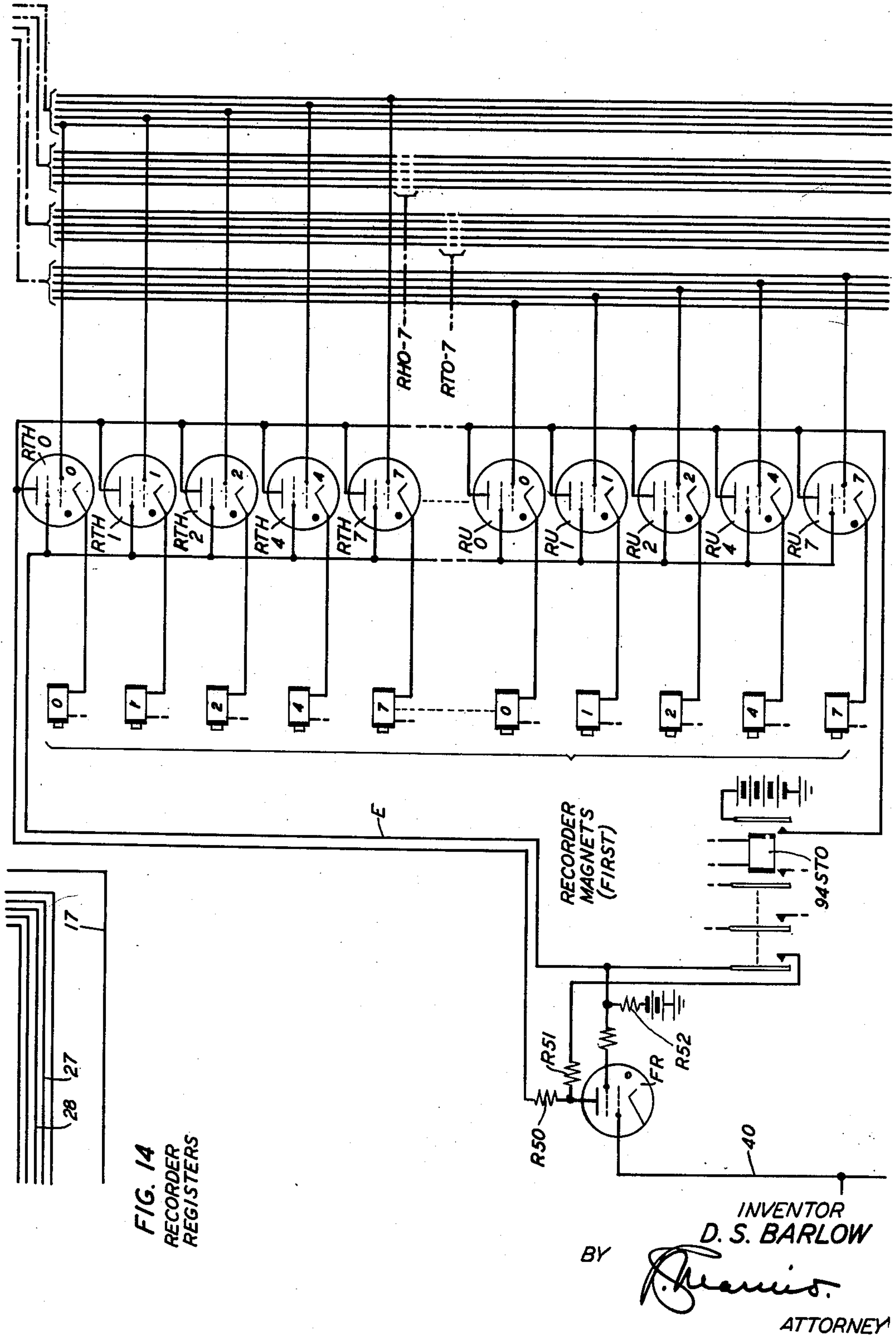
Fig. 14 shows the recorder registers of the first recorder, together with the recording magnets of said recorder.
Figure 15:
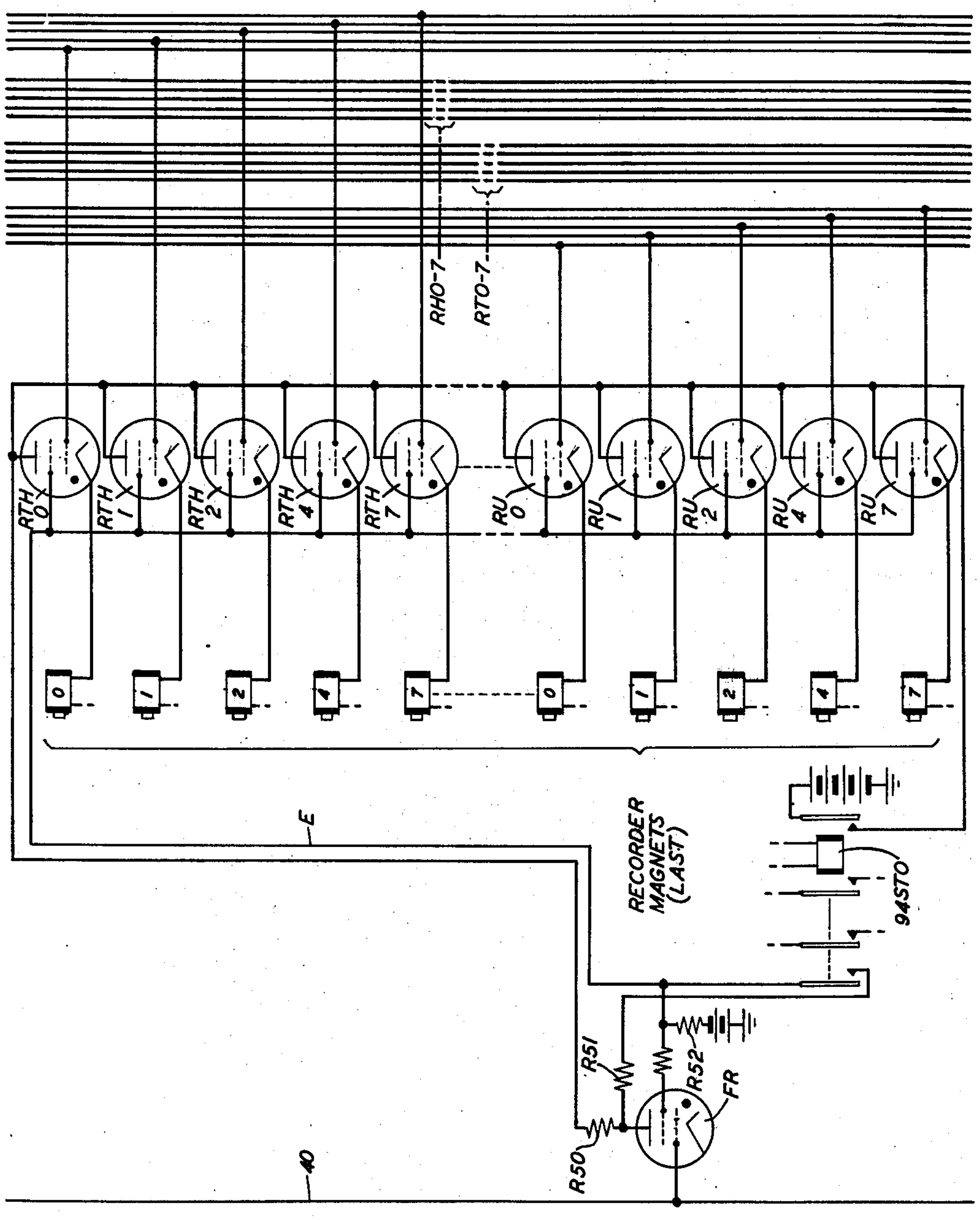
Fig. 15 shows the recorder registers of the last recorder, together with the recorder magnets of said recorder.

Figs. 14, 15 and 16 represent a plurality of recorder-registers to any one of which the registrations recorded in each of the four digit registers of Fig. 13 may be transferred depending upon which of the recorder registers has initiated the request for the identification of the directory number. Each recorder-register comprises a group of five gas-filled tubes per digit RTH0 . . . RTH7—RU0 . . . RU7, to the first grids of which the cathodes of the digit registers of Fig. 13 are connected in corresponding order. The second grids of the tubes of each recorder-register are connected together and to a conductor "E" to which a positive potential is applied if the recorder to which said conductor appertains is the one which initiated the request for the identification of the directory number. On the other hand, the cathodes of the tubes in each recorder-register are severally extended to the recording magnets of a recording device which may be, for example, of the kind shown in copending application of W. W. Carpenter, Serial No. 588,401, filed April 14, 1945, while anode battery for the register tubes RTH . . . RU of each recorder-register is supplied from a relay such as relay 94ST0 of a recorder unit which may be of the type disclosed in copending application Serial No. 759,402, filed July 7, 1947, jointly for W. W. Carpenter and R. C. Collis, said relay 94ST0 being the identically designated relay in Fig. 94 of the disclosure of said copending application but modified to include an additional pair of contacts to supply positive battery to the anodes of the associated recorder-register and to control the voltage on its second grids.

Normally when two tubes in each of the digit registers of Fig. 13 are rendered conducting to indicate the value of the digit registered thereby according to the two-out-of-five code, the cathodes of said tubes are rendered positive. By virtue of the connection between said cathodes and the grids of the tubes of all the recording registers, the first grids of the corresponding two tubes in each of the recorder-registers are thereby rendered positive. The tubes in each of the recorder-registers whose respective first grids are thus rendered positive are prevented from operating, however, except in the case of that recorder-register whose relay 94ST0 has been operated in any suitable manner, or as described in the above-mentioned Carpenter-Collis copending application, and when conductor "E" has had positive potential applied to it, both as an indication that the directory number information stored in the digit register tubes of the output circuit is to be transferred thereto. The activation of two out of five tubes in each group of five tubes of said recorder-register then operate and complete current paths to the involved recorder magnets which operate to record on a suitable medium and in the two-out-of-five code the digits of the identified directory number.

The recording-register shown in Fig. 16 is reserved for the transmission of the digits of the directory number to some remote recorder which is connected, as shown, by a trunk or other transmission medium with the recording register of Fig. 16. For the purpose of the distant transmission of the identified directory number information, four groups of five transmitting tubes DTH0 . . . DU7 are provided, to the corresponding second grids in each group of which is connected one of five frequency sources $f_0$, $f_1$, $f_2$, $f_4$, and $f_7$. The cathodes of each group of tubes are connected together and to a conductor extending to a scanning circuit (not shown but indicated) which may be of any suitable construction, while the cathodes of the recording-register tubes RTH0 . . . RU7 are connected to corresponding grids of the transmitting tubes. It will be shown by the detailed operation which follows that frequencies combined in the two-out-of-five code are transmitted over the trunk in accordance with the code indications of the identified directory number registered in the register tubes RTH0 . . . RU7.

Figures 17A, 17B, 18:
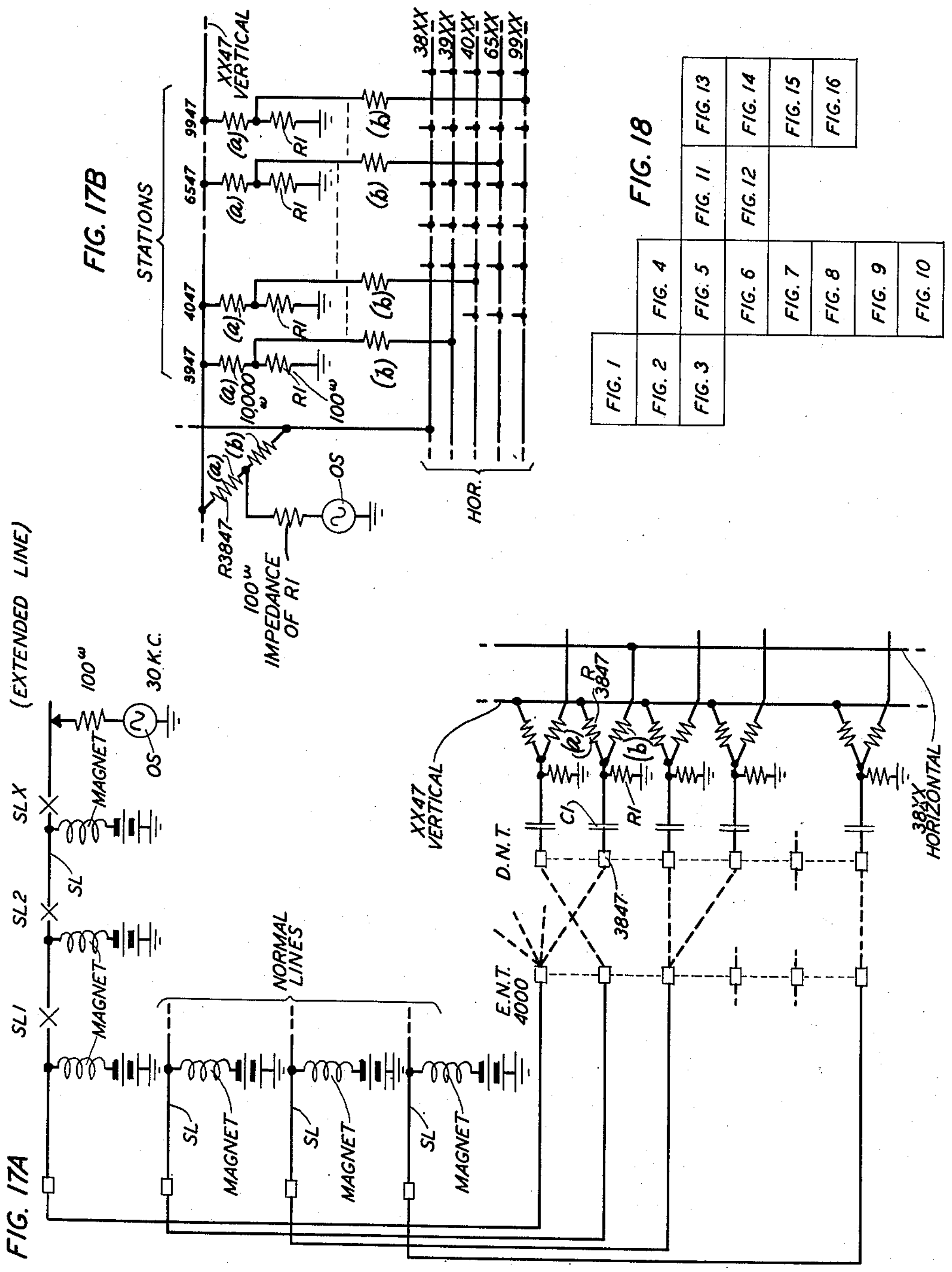

Figs. 17A and 17B show partial details of a primary network, which have been arranged to more clearly present certain electrical properties of the network that will be described in connection with the detailed description of the operation of the invention.

Having described in a general way the structure of the component elements of the invention and the manner in which they cooperate to produce the result of identifying, indicating and recording the directory number of a calling telephone station, I will now describe the detailed operation of the invention in connection with the identification and recording of the directory number "3847" of station A when a call is placed from said station.

When a call is initiated from station A, the line L to which the station is connected is extended in the usual manner over the line-extending switches LS1 . . . LSX to the trunk T, the magnets of the switching train being held operated by ground over the normal contacts of relay SIG. After the office code of the wanted station is dialed and registered in the registers of the sender (the latter controlling the extension of the connection) said sender determines from this code that the call requires the recording of the directory number of the calling station. Relay CI is then operated in any suitable manner, whereupon the tip and ring conductors T and R of the trunk are switched to the Station Identification Circuit SIC, which then operates to determine the identity of the calling station in the manner described in the above-mentioned patent to M. A. Logan. Since the call was placed at station A, circuit SIC, as a consequence of the test it makes over the line L, causes the operation of relay A of the trunk party register, which relay locks over its locking winding under the control of an off-normal ground ON, and applies ground to conductor 7; circuit SIC then releasing for use by other trunks in the event that said circuit is used in common by more than one trunk.

The sender further initiates circuit operations that result in the operation of relay ST (Fig. 9) of a starting circuit by the application of an impulse of current to conductor ST', whereupon a circuit is completed for said relay ST from impulse potential on conductor ST', No. 2 back contacts of relay FN, winding of relay ST, to battery, over which relay ST operates and then locks over its No. 2 contacts to ground on the No. 1 contacts of relay FN. Over its No. 3 contacts, relay ST applies positive battery to conductor 17, said conductor extending to the anodes and grids of various tubes of the identifier as shown, including the first grid of tube ITH through the delay network DN1 and the second grid of said tube through delay network DN2, thus rendering both of said grids positive. It will be be observed that the first grid of tube ITH (as well as the first grid of each of the similar tubes IH . . . IU) is normally biased to cut-off by the negative potential available at said grid through negative battery connected to resistor RC0. The constants of the delay network DN1 are so computed that the negative bias provided for the grid of tube ITH by the negative battery through resistor RC0 is not overcome by the positive potential applied to said grid over conductor 17 until (1) the transient disturbances generated by the closure of the No. 3 contacts of relay ST will have been dissipated and a steady state potential is attained on conductor 17, and (2) until sufficient time will have passed to make a test of the impedance of the sleeve conductor SL which, if the test indicates that said impedance is outside of its predetermined limits, will result in a change of the normally positive potential on conductor 16 to a negative value, as later to be described. When this period of delay is passed, the first grid of tube ITH is rendered positive, thereby causing said tube to conduct inasmuch as the second grid thereof was also rendered positive as previously described. The positive potential then available at its cathode is applied to the first grid of tube THSL and to the first grid of tube OTH. Since tube IN2 of the Sleeve Impedance Check circuit is normally non-conducting, thereby maintaining positive potential on conductor 16, and, therefore, on the second grids of tubes THSL . . . USL, tube THSL will be rendered conducting by the application of positive potential on its first grid unless, as a result of the check of the sleeve impedance which takes place immediately upon the operation of relay ST, tube IN2 is enabled due to said impedance not being within predetermined values, in which event the potential on conductor 16 will have been changed to a negative value to prevent the operation of tube THSL. On the other hand, tube OTH will remain cut off because at the time positive potential is applied to its first grid by the conductivity of tube ITH, negative potential is being maintained on its second grid over conductor 45 by the normally operated tube CT of the Code Check circuit.

Over its No. 1 contacts, relay ST extends one side of oscillator OS over conductor 46, capacitor C2, inductance IND to ground, and in parallel with the latter over resistor R9, over conductor 15 to the grid of tube A1. When relay SIG is operated in any suitable manner, the oscillator OS is applied to the sleeve conductor SL of the extended connection, the magnets of the switch train holding to ground on the normal contacts of relay SIG when said relay is unoperated and to ground through resistor R9 and inductance IND when said relay is operated. The operation of relay SIG further completes a circuit from ground through the oscillator OS to the sleeve conductor SL as above described, over the terminal S, terminal 4000 in the terminal bank Eqpt. No. Term., thence over four separate conductors to the four directory number terminals in the terminal bank Dir. No. Term., each conductor individual to one of the four stations A, B, C and D of the line L, thence over the capacitor C1 and resistor R1 to ground of each of the Termination Networks connected to each of said terminals.

The oscillator OS may be of any suitable construction. It should have a low impedance and should be adapted to generate a high frequency current. This frequency should be higher in frequency than that of the noise which, being generally within the limits of 1 to 10 kilocycles, suggests what the frequency of the oscillator should be above the higher limit. By way of example, the oscillator may be one that generates a frequency of 30 kilocycles.

The characteristics of the oscillator OS, the constants of the Termination Network connected to each of the directory number terminals, and the constants of the passive elements in a primary network PDN– bear a relationship to each other which, going to the essence of the present invention, is best explained by a consideration of the simplified circuit diagrams shown in Figs. 17A and 17B, the former schematically indicating the electrical conditions on the sleeve conductor SL of a line, such as line L, for example, of an extended connection, and the normal condition on other representative sleeve conductors of lines on which no calls have been initiated, while the latter figure indicates the relationship between the oscillator OS and some of the passive elements in the primary network PDN–A.

In a switching train of an extended connection as, for example, a switching train in an exchange which employs cross-bar switches, said switch train comprises a number of switches each of which, after being operated to extend the line, is held in an operated position by a magnet connected to battery and by a ground applied to the sleeve conductor SL. The lines that are normal, on the other hand, have the magnet of the first switch normally connected to their respective sleeve conductors. This is clearly shown in Fig. 17A. All of the sleeve conductors in the exchange are, of course, extended over conductors to the equipment number terminals of the various lines, as previously explained.

When the identifying signal is to be applied by the oscillator OS to the sleeve conductor SL of the extended connection, the ground holding the magnets of the switch train at the normal contacts of relay SIG is replaced on the operation of said relay by ground through the inductance IND. The resistance of this inductance should be low enough to provide sufficient current to hold the magnets of the connection train operated.

The presence of battery through the magnets on the sleeve conductors SL of the lines in a non-calling conditions, and the fact that all the sleeve conductors in the exchange are interconnected through the horizontal and vertical conductors of the primary networks PD– (as shown in Fig. 17A), requires that the Termination network connected to each of the directory number terminals be provided with a capacitor C1 to prevent the establishment of battery current drain circuits through each of the magnets, conductor SL, and Termination resistors R1.

Mention has been made of the fact that the oscillator OS should have a low impedance. The reason for this is that the impedance of said oscillator must match, substantially, the impedance of the Termination element R1, which must itself be low to prevent any appreciable signal potential from being applied to other horizontal and vertical conductors of a primary network than the two conductors therein to which element RXXXX marking the directory number of the station to be identified is connected. Under these circumstances, and the additional fact that the impedance of each of the passive elements RXXX must be high in comparison with the Termination impedance R1, the quantity of signal potential available at the two horizontal and vertical conductors of the primary network to which the passive element RXXX of a station is connected is high, while that which is available on other conductors of the network is low, thereby providing at each of said other latter conductors a quantity of signal potential which is ineffective to counteract, after passing through the Number Circuits, the positive bias normally applied to the cathodes of the tubes AG0 . . . AG7.

Fig. 17B indicates an abbreviated portion of the primary network PN–A to illustrate the distribution of signal potential above briefly indicated. In this figure, the oscillator OS is shown at the location of the Termination impedance R1, while the components (a) and (b) of the station element R3847 are shown connected, respectively, to the vertical conductor XX47 and the horizontal conductor 38XX. Along the vertical conductor XX47 are connected the components (a) of other elements RXXXX, the respective stations of which have the tens and units digits of their respective directory numbers ending with 47, said elements connecting, of course, with their respective Termination impedances R1 to ground but for which, with respect to element R3847, the oscillator OS having an equivalent impedance, is shown in place thereof. Component (b) of element R3847 as well as components (b) of all elements representing stations the thousands and hundreds digits of whose directory numbers begin with 38, are connected to horizontal conductor 38XX.

Now if, by way of example, it is assumed that the Termination impedance R1 is 100 ohms (the impedance of the oscillator OS being also in the order of 100 ohms), that the impedance of each components (a) and (b) of element RXXXX is 10,000 ohms, and that the signal potential is applied at the common terminal of an element RXXXX, for instance element R3847, the quantity of potential available on vertical conductor XX47 is largely controlled by the number of elements (a) connected to vertical conductor XX47. Besides component (a) of R3847, there are ninety-nine (99) other elements (a) connecting conductor XX47 to ninety-nine (99) corresponding terminating resistors R1, each of which connects to ground. Signal potential applied to terminal R3847 passes through one 10,000-ohm element (a) to vertical conductor XX47 and thence in parallel through ninety-nine 10,100-ohm combinations of element (a) and resistor R1 to ground. The signal potential on vertical conductor XX47 is therefore slightly over one hundredth the signal applied at terminal R3847. This is the signal which is delivered to a secondary network and, thereafter, to other circuits to identify the tens and units digits. In the same way, about one hundredth of the applied signal potential is delivered on horizontal conductor 38XX. The signals on buses XX47 and 38XX are in this example the wanted signals and the factor one hundredth may be called the forward transmission of the primary network. Signal on conductor XX47 passes through each of ninety-nine other elements (a) to its corresponding terminal RXX47. The transmisison of the signal from conductor XX47 to any one of the ninety-nine terminals RXX47 other than R3847 is determined roughly by the ratio of the impedances of termination R1 and element (a). In this example the ratio is 100 ohms to 10,000 ohms and the transmission is about one hundredth. This factor may be called the backward transmission of the primary network and the signals on all terminals RXX47 other than R3847 are the unwanted signals. The unwanted signals are in no way distinguishable from the wanted signal and will act on the primary network in the same manner except that an unwanted signal is smaller than a wanted one by the product of the forward and the backward transmissions, in this example one hundredth by one hundredth or one ten-thousandth. (The forward and backward transmissions need not be equal.) The ratio of the wanted to the unwanted signal may be made as great as necessary by increasing the forward transmission and decreasing the backward transmission, this being done by decreasing the number of elements (a) on a given conductor such as XX47, and by either reducing the impedance of R1 or increasing that of component (a). In other words, a primary network PDN– is so arranged that because the impedance of the Termination R1 is small in comparison with the impedance of each of the components (a) and (b) of element RXXXX, the signal potential available on the vertical conductors, other than the one to which is connected the component (b) of the element RXXXX to which the signal is applied, is so small in comparison to the potential available on said one vertical conductor to which the component (b) is connected, that discrimination against them to prevent the operation of detecting devices connected to said other conductors can be easily effected. In the same manner, the signal potential available on the one horizontal conductor to which the component (b) of the element RXXXX to which the signal potential is applied is large enough to be used for controlling a detecting device connected thereto, while the signal potential available on the remaining horizontal conductors is so small by comparison that discrimination against them to prevent the control of similar detecting devices connected to said conductors is easily effected.

Thus, the primary network of passive elements of my invention is so arranged that the application of a signal potential to any one of the elements thereof will afford good "forward" signal transmission along the two conductors in the network which are connected to the element, and poor "backward" transmission along the remaining conductors of the network, even though the latter conductors are connected to the element to which the signal potential was applied through other elements of the network.

In the same manner, on the same principle and by substantially the same arrangements, the passive elements in each of the pair of secondary networks SDH and SDV provided with each primary network PDN– are of a value that, for the signal potential available at the common terminal of a passive element transmitted thereto over a conductor, for example conductor 38XX, from the associated primary network, the networks provide good transmission along the four code conductors connected to said element and poor transmission along other code conductors connected to said network.

Specifically (and referring to Fig. 17B), when the signal potential is applied to the Termination R1 of element R3847, component (b) thereof will cause a part of said signal potential to be available on vertical conductor XX47, which potential can be successfully utilized to control a detecting device connected to said conductor by, for example, connecting said conductor through a suitable network (the secondary network SDV) to the grids of electronic devices such as, for instance, the two numerical tubes T0 and T4 of the tens tubes T0 . . . T7, and the two numerical tubes U0 and U7 of the units tubes U0 . . . U7 of the incoming gates. The minute portion of said potential which appears on the vertical conductors 00XX . . . 0046 and 0048 . . . 099 can be discriminated against by a suitable adjustment of potentiometer PT3 (on Fig. 13) which controls the bias provided on the grid of tube CL which, in its cathode, controls the bias of tubes AG0 . . . AG7 by the control of their cathodes. In the same manner, the component (a) of element R3847 will cause a part of said signal potential to be available along horizontal conductor 38XX, which potential can be successively utilized through secondary network SDH to control tubes TH1 and TH2 of the thousands tubes TH0 . . . TH7 and tubes H1 and H7 of the hundreds tubes H0 . . . H7 in all incoming gates, while negligible fractions of said potential which appear on the horizontal conductors 00XX . . . 37XX and 39XX . . . 99XX by reason of the transmission from conductor XX47 backward to the common terminal of components (a) and (b) of elements R0047 . . . R3747 and R3947 . . . R9947 and from each such terminal forward to horizontal conductors 00XX . . . 37XX and 39XX . . . 99XX, are discriminated against by the adjustment of potentiometer PT3 in the same manner as above.

Continuing, now, with the detailed description of the invention, the signal potential made available at the Termination C1—R1 is further transmitted over station conductor 1 to the center terminal of passive element R3847 whence, over the component (a) thereof, a part of said potential is transmitted over conductor 38XX to the common terminal of the four-element resistor R38XX of the secondary network SDH. In the same manner and over component (b) of said element, a part of said signal potential is transmitted over conductor XX47 to the common terminal of the four-element resistor RXX47 in the secondary network SDV.

It should be recalled that the signal potential available at Termination C1—R1 and transmitted over conductor 1 to the element R3847 individual to station A in the primary network PDN–A, is also available over similar other Terminations for transmission over the station conductors 2, 3 and 4 to similar passive elements individual to stations B, C and D in primary networks PDN–B, PDN–C and PDN–D, respectively. In consequence, the code conductors in the pair of secondary networks SDH and SDV individual to each of said primary networks will have signal potential thereon, which will be applied to the grids of the tubes TH0 . . . U7 in each of the input gate circuits B, C and D in accordance with the code representations of the directory numbers of the stations B, C, and D. However, since relays B, C and D of the trunk party register are normal and, therefore, no ground is applied to conductors 8, 9 and 10, the cathodes of the tubes TH0 . . . U7 in each of said gates will not be enabled, while those of input gate A will be enabled. Thus, although the signal potential is applied to the grids of all tubes TH0 . . . U7 in all input gates in accordance with the code representations of the directory numbers of all stations on the line when one of said stations on said line originates a call, only the tubes TH0 . . . U7 of the input gate corresponding to the station group containing the station which originated the call will be activated, said activation being determined, as said before, by the operation of the appropriate relay A, B, C or D of the trunk party register.

That part of the signal potential which is available at the outer terminals of the two horizontal elements of resistor R38XX and, through the pair of vertical conductors 3XXX, is made available on the code conductors 1 and 2 within the bracket TH of the secondary network SDH, is applied over said code conductors 1 and 2 to the input filters THI-1 and THI-2, respectively, of the input gate A. These filters, as well as all similar filters in all the incoming gates, are designed to pass the frequency of the signal (in the present embodiment of the invention 30 kilocycles) and to suppress or attenuate all lower frequencies which may be present along with the frequency of the signal potential. The signal potential is thus applied to the grids of tubes TH1 and TH2 (for the thousands digit "3") of input gate A. In the same manner, the signal potential available at the outer terminals of the vertical elements of resistor R38XX which, through the pair of horizontal conductors X8XX are joined to the two code conductors 1 and 7 within the bracket H of secondary network SDH, is similarly applied through filters HI-1 and HI-7 to the grids of tube H1 and H7, respectively (for the hundreds digit "8") in the incoming gate A. Similarly, the signal potential applied to the common terminal of the four-element resistor RXX47 in secondary network SDV results in the application of a part of said potential to code conductors 0 and 4 within the bracket T and to code conductors 0 and 7 within the bracket U, which potentials are further applied to the grids of tubes T0 and T4 (for the tens digit "4") through filter networks T1-0 and T1-4, respectively, and to the grids of tubes U0 and U7 (for the units digit "7") through filter networks U1-0 and U1-7, respectively, of incoming gate A. These tubes will now cause the signal frequency to modulate the space current of the tubes, provided that the negative bias on the grids thereof which is supplied from the cathodes of tubes THSL . . . USL in their non-conducting state will have been rendered positive by the conductivity of said tubes in response to a successful test of the value of the sleeve impedance, as previously indicated, and in response to the successive operations of the Digit Scan circuit.

Mention has been made of the fact that tubes TH1 and TH2 of the activated incoming gate circuit A will modulate the current therethrough in accordance with the frequency of the signal potential, provided that the negative bias normally applied to the grids of the five thousands digit tubes TH0 . . . TH7 over conductor 11 by the negative potential from the cathode of tube THSL is changed to a less negative bias by the operation of said tube. The operation of said tube THSL is controlled by two conditions. On the one hand, it is controlled by the operation of tube ITH which, upon being rendered conducting by the application of positive potential on conductor 17 due to the operation of the start relay ST as previously described, causes positive potential to be applied to the first grid of tube THSL. On the other hand, it is controlled by the potential on its second grid, which is normally positive because conductor 16 is connected to the anode of the normally non-conducting inverter tube IN2 of the Sleeve Check circuit. Since positive potential is applied to the first grid of tube THSL by the operation of tube ITH, tube THSL will be rendered conducting immediately upon battery being applied to conductor 17, and will remain conducting unless the potential on conductor 16 is changed in the meanwhile from positive to negative as a result of tube IN2 being rendered conductive in consequence of the operation of Sleeve Check circuit.

The condition of tube IN2 is determined by the result of the test of the sleeve impedance. When relay SIG operates and the signal potential from the oscillator OS is applied to the sleeve conductor SL of the extended connection over conductor 46 and the contacts of said relay SIG, the potential available at the upper terminal of resistor R9 (which is the value of the signal potential applied to conductor SL) is also applied over conductor 15 to the grid of tube A1. It is apparent that whatever may be the value of the sleeve impedance, that value will determine the drop in potential across resistor R9. It is the function of the Sleeve Check circuit to determine from this drop, which is applied to the grid of tube A1, whether the value of the sleeve impedance is or is not within predetermined limits.

Tube A1 is an ordinary amplifier tube whose cathode is connected to the grid of a second amplifier tube A2 over an interposed band-pass filter adapted to transmit the frequency of the signal potential. The anode of tube A2 is connected to the grid of a third amplifier tube A3 through a network comprising a band-pass coupling transformer, a rectifier and a low-pass filter which rejects the frequency of the signal oscillator and all higher frequencies. The resulting potential applied to the grid of tube A3 is a measure of the amplitude of the oscillator signal appearing at the grid of tube A1, being more positive when said signal is greater, and less positive when said signal is less.

Whatever may be the impedance of the sleeve conductor S1, the drop in potential across resistor R9 resulting therefrom is applied over conductor 15 to the grid of tube A1, which tube applies the potential to the grid of tube A2, the latter amplifying said potential for application to the grid of tube A3.

The negative half waves of the signal potential are eliminated by the rectifying network, and the average potential of the positive half waves is applied to the grid of tube A3, the value of the positive potential applied to its grid then being a measure of the amplitude of the signal frequency applied to conductor SL, and hence a measure of the sleeve impedance, the amplitude of the signal frequency at oscillator OS being kept constant.

Before proceeding with the effects of the signal potential on tube A3, it is desirable first to describe the condition of the tubes of the Impedance Check circuit and to note as a preliminary thereto that if the grid of tube A3 is at some potential indicative of a normal value of the impedance of the sleeve conductor SL, tube A3 will conduct, in which case the positive potential available at its cathode is sufficient to overcome the negative bias normally applied thereto, thus rendering the potential on conductor 27 positive.

Cathode of tube A3 is connected by conductor 27 over a delay network DN3 to the first grid of a mixer tube CS, which grid is also connected to a slide wire potentiometer PT1, the latter being so adjusted as to provide said grid with a positive potential that will cause said tube to conduct on application of the correct value of potential from the cathode of tube A3 through delay network DN3 to the first grid of tube CS, provided, however, that the second grid thereof is also at positive potential. The cathode of tube A3 is also connected over conductor 27 to the grid of inverter tube IN1, said grid being supplied with a negative potential from the slide wire potentiometer PT2, thereby to cause tube IN2 to be normally cut off when the potential on conductor 27 is positive consequent to the current through tube A3 being of the value determined by the impedance of sleeve conductor SL being within predetermined limits. The fact that tube IN1 is thus normally cut off and the fact that the second grid of tube CS is connected to the anode of tube IN1, causes the positive potential normally available on the anode of tube IN1 from conductor 17 to overcome the normal negative bias on the second grid of tube CS, changing the potential of said second grid from negative to positive. Thus with positive potential applied to its first grid and positive potential applied to its second grid, tube CS will be normally rendered conducting as soon as relay ST operates and applies positive potential to conductor 17.

The grid of inverter tube IN2 is normally cut off by negative battery supplied through resistor R65. On the application of positive battery to conductor 17, tube IN2 is rendered conducting. When tube CS is rendered conducting by the action above described, tube IN2 is cut off.

Thus under the condition that the value of the sleeve impedance is within predetermined limits, tube CS will be conducting, tube IN1 will be non-conducting and tube IN2 will also be non-conducting. The positive potential applied to the anode of tube IN2 from conductor 17 overcomes the negative bias normally applied to said anode, thereby to cause positive potential to be applied to conductor 16 which will cause tubes THSL . . . USL to be rendered conducting as the grid of each is progressively rendered positive by the respective and successive operation of tubes ITH . . . IU.

It is now evident that if the value of the sleeve impedance changes to some value below or above the predetermined limits, that change will be manifested by a change in the potential applied to the grid of tube A3. For instance, if the sleeve conductor SL were to be falsely grounded, the potential applied to the grid of tube A3 would be very small. The positive potential available at the cathode of the tube as a result of its lower conductivity will be insufficient to overcome the normal negative bias connected to said cathode, under which condition said cathode potential is insufficient to overcome the negative bias normally applied to the first grid of tube CS from potentiometer PT1 thereby allowing the first grid of tube CS to remain cut off.

The value of the negative potential on conductor 27 will not, of course, effect the potential on the grid of tube IN1 since this potential is already negative. Tube IN1, therefore, remains cut off so that, as a result of the value of the sleeve impedance changing to a value below its predetermined limit, the conductivity of tube CS is suppressed without effecting the non-conductivity of tube IN1, in which event the positive potential on the anode of tube CS overcomes the normal negative bias connected to the grid of tube IN2 through resistor R65, rendering said grid positive and enabling tube IN2. The potential at the anode of said latter tube is thus made negative and applied to conductor 16 to preclude the operation of tubes THSL . . . USL and thereby prevent the selected incoming gate circuit A from transmitting identifying signal potential to the Number circuits.

Let it now be supposed that the impedance of the sleeve conductor SL increases beyond predetermined limits by, for example, said conductor going open. In this event, the full potential of the oscillator OS will be applied to the grid of tube A1 and the rectified positive potential resulting therefrom which is applied to the grid of tube A3 will increase the space current through said latter tube, causing a rise in potential at the cathods thereof which is positive relative to its normal negative bias. This positive potential will, after a delay by the network DN3, overcome the normal negative bias on the first grid of tube CS and would thereby render said tube conducting except for the action of its second control grid. This positive potential will also effect the potential at the grid of tube IN1 which, being normally negative, is now made positive, thereby to cause said tube to conduct. The potential at the anode of tube IN1 is now lowered, and since this anode is connected to the second grid of tube CS, the potential thereat is made negative, thereby causing said latter tube to cease to conduct notwithstanding the positive potential at its first grid. The suppression of conductivity in tube CS causes tube IN2 to become conducting for the reasons previously given, thereby to cause negative potential to be applied to conductor 16 and preclude the operation of tubes THSL . . . USL.

Thus when the impedance of the sleeve conductor SL is within predetermined limits, the normal non-conducting condition of tube IN2 is undisturbed and the potential on conductor 16 which is normally positive, remains so. When the impedance is outside of said limits, either higher or lower, tube IN2 is rendered conducting to change the potential on conductor 16 to a negative value. Remembering that positive potential was applied to the first grid of tube THSL when tube ITH was enabled, positive potential on the second grid of tube THSL from conductor 16 will enable the latter tube, thereby to cause a direct-current positive potential to be applied from its cathode over conductor 11 to the grids of the thousands tubes TH0 . . . TH7 of all input gate circuits, thereby enabling those of input gate circuit A, which have been enabled in their respective cathodes by the operation of the party register relay A. The alternating signal potential, however, is only applied to the grids of tubes TH1 and TH2. Hence the signal potential is amplified through said latter two tubes and transmitted over conductors G1 and G2 to Number circuits 1 and 2, respectively, the path thereof for each circuit being through the anode of tube TH1, for example, conductor G1, capacitor C10, to ground through an undesignated impedance. The potential derived from this signal current is applied to the grid of tube AMP1. It will be noted that while all the thousands tubes TH0 . . . TH7 of input gate circuit A have been activated, the signal potential is only applied to the grids of the two tubes TH1 and TH2. The fact that the remaining three tubes TH0, TH4 and TH7 have been enabled will have no effect in their associated Number circuits 0, 4 and 7 due to capacitor C10 in each of said circuits blocking the passage of direct current.

The five Number circuits 0, 1, 2, 4 and 7 shown in Fig. 11 are identical, Number circuit 1 being disclosed therein in detail. Each circuit comprises three stages of amplification AMP1, AMP2 and AMP3 and associated networks, a detector rectifying stage HT1, a conventional amplifier HT2 and a "time integrator" INTG, the output of which is applied over conductor 31 to the grid of a tube AG- in the Output circuit of Fig. 13, the time integrator INTG of Number circuit 0 being connected to the grid of tube AG0, that of Number circuit 1 being connected to the grid of tube AG1 and so on up to and including the time integrator of Number circuit 7, which is connected to the grid of tube AG7.

The potential modulated by the signal frequency which is transmitted through tubes TH1 and TH2 is applied to the Number circuits 1 and 2 through code conductors G1 and G2, respectively, as will be recalled. Considering, for example, the operation that takes place in Number circuit 1, the signal potential is transmitted through capacitor C10 to the first grid of amplifier tube AMP1. The network interposed between condenser C10 and the grid of tube AMP1 is a band-pass filter which tends to suppress all frequencies except the signal frequency, similar filters being interposed between the anodes of preceding stages of amplification and the first grid of the amplifier tube AMP– in the succeeding stages of amplification. The signal potential is thus transmitted and amplified through the three amplifier stages AMP1, AMP2 and AMP3.

The tube HT1 is normally biased to cut off by battery applied through the variable resistor R10 and acts as a rectifier to cut off the negative half cycles of the signal potential, the positive half cycles thereof being amplified by tube HT1 and applied to the grid of tube HT2 where such positive half cycles are further amplified. The two stages of resistance-capacitor low-pass filters between tubes HT1 and HT2 are suitably designed to obtain a rectified signal voltage which is proportional to the amplitude of the signal frequency only. Thus, as the intensity of the signal frequency increases, the direct-current voltage available at the anode of tube HT2 increases in the positive direction. This rectified direct-current voltage, proportional to that of the signal voltage, is applied to the time integrator INTG.

As previously stated, one of the objects of the present invention is to provide a circuit as part of the identifier by which the integrity of the identifying signal is checked for frequency, amplitude and duration before it is applied to the digit registers of the Output circuit, the reason being to preclude the setting of said registers by any signal whose frequency, amplitude and duration is not that of the oscillator OS. The frequency of the signal is, of course, checked by the various pass-band filters suitably located along the path of transmission, as previously described. The frequency of the signal is further detected and rectified by tube HT1 and amplified by tube HT2, to provide a direct-current voltage output which is proportional to the amplitude of the alternating voltage of the signal. The duration of the signal is checked by the time integrator INTG, which functions to pass the rectified signal voltage to the grid of tube AG– only in the event that the signal persists for a predetermined minimum duration. This check on the minimum duration of the signal is to guard against false operation of the registers by transients which may be of the same frequency as the signal frequency but which, because of their transient character, will not persist continuously for a period comparable to the duration of the identifying signal, which is maintained on the sleeve conductor SL of the connection until relay ST is released, as will be described. Inasmuch as transients are usually intermittent, the intervals between successive applications of transient signal frequency are utilized by the time integrator INTG to discharge the effects of the transient previously applied, thus precluding any "time accumulation" of the transients in simulation of the minimum period of the identifying signal.

The time integrator INTG for each of the Number circuits comprises three or more capacitors C11, C12 and C13, coupling resistors R11, R12 and R13 and a common resistor R14. The rectified (and inverted) signal voltage available at the anode of tube HT2 serves to charge capacitor C11, the time taken to charge said capacitor depending upon the "time constant" determined by the characteristics of resistor R11 and that of the capacitor C11, resistor R14 being small compared to resistor R11. During the time, therefore, that capacitor C11 is being charged, no rectified signal voltage is available on conductor 31 for application to the grid of tube AG1. As capacitor C11 becomes charged, however, rectified signal potential will be available at the right terminal of resistor R12, and will serve to charge capacitor C12, thus repeating the delay operations incident to the charging of capacitor C11. As in the case of the latter capacitor, the time taken to charge capacitor C12 will depend upon the time constant of the combination R12—C12, resistor R12 being large compared to resistors R11 and R14. As condenser C12 becomes charged, the rectified signal potential will be available at the right terminal of resistor R13, whence capacitor C13 is charged in the same manner as capacitor C12, the time taken to charge said capacitor C13 depending upon the time constant of the R13—C13 combination, resistor R13 being large compared to resistors R12, R11 and R14. As capacitor C13 becomes charged, the rectified signal potential then available at the right terminal of resistor R13 is applied over conductor 31 to the grid of tube AG1.

Thus the minimum duration of the identifying signal is measured by the time taken to charge capacitors C11, C12 and C13 seriatim, and this time may be increased or decreased by suitable values of the capacitors and resistors by the addition of other capacitor stages in the case of an increase and by the reduction in the number of said stages in the case of a decrease.

It should be noted that if the signal potential is only of a duration sufficient to charge capacitor C11, or capacitors C11 and C12, or capacitors C11, C12 and the partial charging of capacitor C13, then the moment said potential is removed, the charged capacitors will discharge through the plate circuit of tube HT2, said tube being normally conducting in the absence of an incoming signal. The reapplication thereafter of the signal potential will again be utilized to charge said capacitors before the potential becomes available on conductor 31 for application to the grid of the tube AG1. By this arrangement in each of the Number circuits, the identifier is protected against false operation by, say, a transient of the same frequency as the signal but which, owing to its momentary duration, will not persist for as long as the signal frequency.

It will be observed that the cathodes of the five Output circuit tubes AG0 . . . AG7 are connected in common to the cathode of tube CL and that the grid of the latter is connected to the slide wire of a potentiometer PT3. The purpose of tube CL is to control the response of tubes AG0 . . . AG7 to signals of the required amplitude incoming from the time integrators INTG in each of the respectively associated Number circuits, said control being effected by so biasing the grid of tube CL by the potential applied from potentiometer PT3 that the cathode potential at each of the tubes AG0 . . . AG7 and tube CL will require a rectified signal potential of a predetermined amplitude at the grids of tubes AG0 . . . AG7 before the latter will be rendered conducting in response thereto. Should the amplitude of the signal potential applied to the grids of tubes AG1 and AG2, for example, be less than the predetermined minimum value required to render said tubes conducting in response to the potential applied to their cathodes from the cathode of tube CL, tubes AG1 and AG2 will not respond. Thus the amplitude of the signal potential is checked by the adjustment of the voltage applied to the cathode of each of the tubes AG0 . . . AG7, said tubes not being rendered conducting if the signal potential applied to the respective grids thereof is less than a predetermined amount.

The conductivity of tubes AG1 and AG2, in response to the rectified signal voltage applied to their respective grids, produces an anode potential which is applied simultaneously to the grids of the companion inverter tubes IG1 and IG2 and, over conductors 27 and 28, respectively, to the grids of tubes CK1 and CK2 of the Code Check circuit in Fig. 12.

Figure 10:
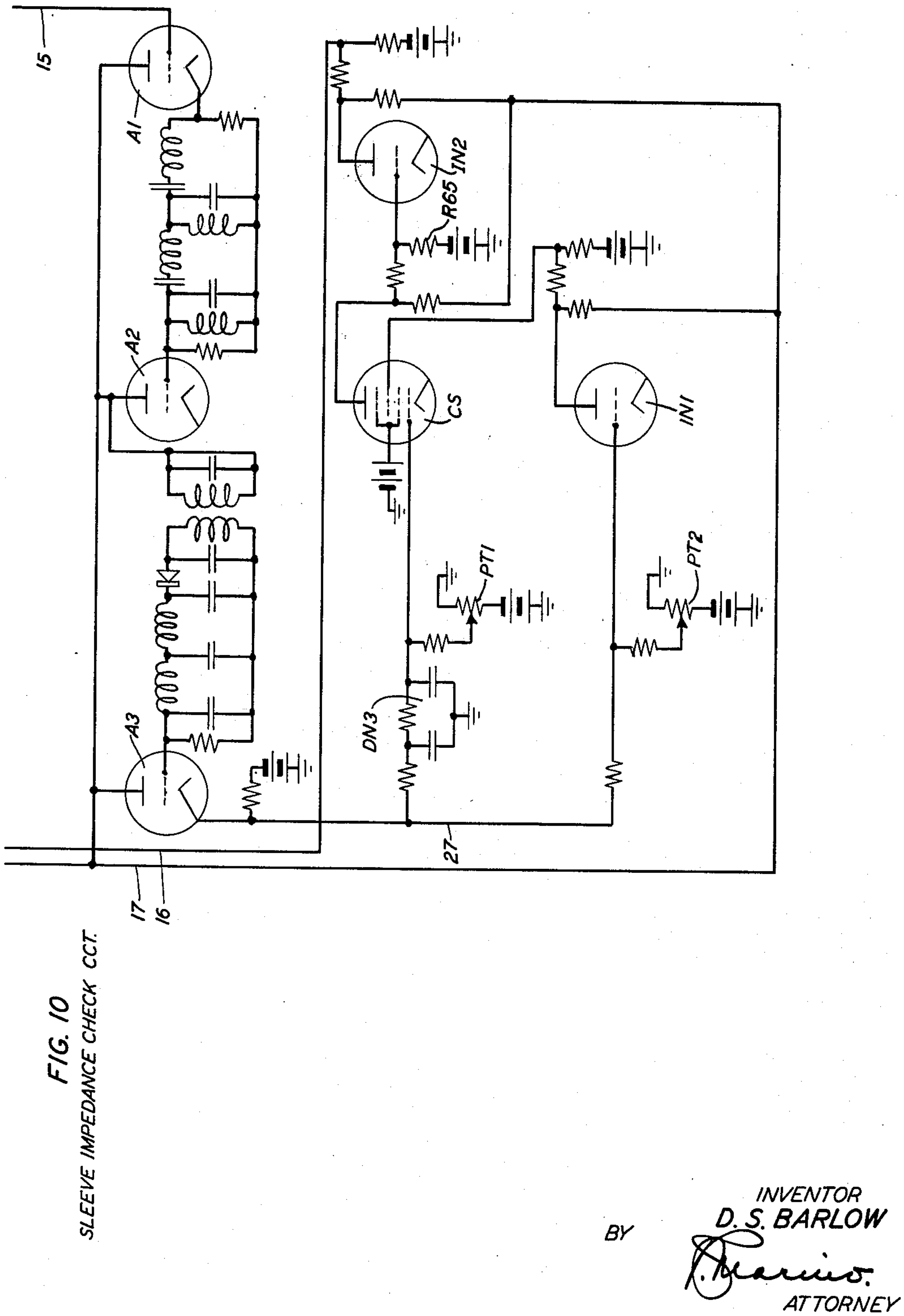
Fig. 10 shows the Sleeve Impedance Check circuit.

The Code Check circuit is similar in some respects to the Sleeve Impedance Check circuit shown in Fig. 10. Its function is to check that two, and only two, Number circuits operate in response to rectified signal voltage emitted from the digit tubes of the activated input gate, to permit subsequent operations of the identifier if two, and only two, Number circuits do operate, and to block such further operations if more or less than two of such circuits operate.

In the Code Check circuit, the five tubes CK0 . . . CK7 are normally conducting by virtue of the ground connected to their respective grids, while tube CC1 is normally cut off by the normal negative bias through resistor R18 connected to its first grid. The adjustment of this bias is such that the tube remains cut off with but four of the tubes CK0 . . . CK7 conducting. Tube CC2 is also normally cut off by the negative bias through resistor R19 connected to its grid. In the case of the latter tube, the bias is so adjusted that the tube remains cut off with but three of the tubes CK1 . . . CK7 conducting. The fact that the second grid of tube CC1 is connected to the anode of tube CC2 renders said grid positive while the latter tube is non-conducting, but this will not effect the non-conductivity of tube CC1 so long as negative potential is maintained on its first grid, as is well known. Inverter tube CT which has its grid connected to a normal negative bias through resistor R20 and to the anode of tube CC1 is normally conducting under the cut-off conditions of tubes CC1, the positive potential at the anode of tube CC1 overcoming the negative bias through resistor R20. Thus with tube CT normally conducting, less than positive potential is applied to conductor 45 which is connected to the second grids of the gas-filled tubes OTH . . . OU, thereby to prevent the latter tubes from being rendered conducting when positive potential is applied to their respective first grids by tubes ITH . . . IU when enabled as described.

Referring now to the tubes AG0 . . . AG7 and to the companion inverter tubes IG0 . . . IG7 of the Output circuit in Fig. 13, it will be observed that positive battery from conductor 17 is applied to the anode of each of said tubes AG0 . . . AG7 through a resistor R15 (so indicated for tube AG0 only), that the normal negative bias for each of the inverter tubes IG0 . . . IG7 is applied through a resistor R17 (so indicated for tube IG0 only), and that the two resistors are joined by an intermediate resistor R16 (so indicated for the tubes AG0 and IG0 only). The ohmic values of resistors R15, R16 and R17 are so proportioned in respect to the voltages of the positive and negative battery sources that, with tubes AG0 . . . AG7 cut off in the absence of a positive signal potential applied to their respective grids from any one of the associated Number circuits, the potential at each of the grids of the associated inverter tubes IG0 . . . IG7 is zero or thereabouts, thus causing said inverter tubes to be normally conducting. Since the grids of said inverter tubes are respectively connected to the grids of tubes CK0 . . . CK7, it follows that the zero potential on grids of the inverter tubes will in no wise effect the conducting condition of tubes CK0 . . . CK7. When, however, a tube AG– operates, for example tube AG1, the anode potential thereof is reduced, and the potential at the grid of the companion inverter tube IG1 is rendered negative, to cut off said latter tube and similarly to effect the associated check tube CK1 in the Check circuit which is thereby also rendered non-conducting. Since, in the normal operation of the identifier there will be two Number circuits operated for each digital identification of the directory number, there will be for each such operation two tubes AG– operated, two inverter tubes IG– quenched and two check tubes CK– also quenched. In the present example the identification of the thousands digit "3" has resulted, as previously described, in the operation of tubes AG1 and AG2. Their operation, therefore, results in inverter tubes IG1 and IG2 being rendered non-conducting and, also, tubes CK1 and CK2 being rendered non-conducting.

With the conductivity of tubes CK1 and CK2 suppressed, and remembering that the first grid of tube CC1 is biased to cut off with but four of the five tubes CK0 . . . CK7 conducting, and that the grid of tube CC2 is biased to cut off with three of said tubes conducting, it follows that when tubes CK1 and CK2 are rendered non-conducting the potential on conductor 30 will be raised above the cut-off bias of the first grid of tube CC1, and applied thereto over delay network DN4. Since the second grid is already positive, tube CC1 will be operated, thereby to lower the potential at the grid of tube CT to cut off and cause said latter tube to be rendered non-conducting, in consequence of which the potential on conductor 45 will be changed from a smaller to a greater positive potential. The change in the value of the potential on conductor 45 is the indication furnished that two, and only two, Number circuits have operated in response to the signal potential from a digital group of tubes in the activated input gate circuit.

In the event, however, that only one Number circuit has operated, say Number circuit 1, then tube CK1 only will be rendered non-conducting. Since tube CC1 is biased to cut off with four of the tubes CK0 . . . CK1 conducting, and tube CC2 is biased to cut off with three of said tubes conducting, the rise in potential on conductor 30 as a result of tube CK1 being rendered non-conducting will not be sufficient to change the bias of either tube. Inverter tube CT, therefore, will remain conducting, the potential on conductor 45 will remain less positive and tubes OTH . . . OU will be precluded from operating.

Should three or more Number circuits operate, three of the tubes CK0 . . . CK7 will be quenched. In this case the rise in potential on conductor 30 with two or less of tubes CK0 . . . CK7 conducting will be sufficient to overcome the cut-off bias on the grid of tube CC2 and, after a delay measured by the constants of network DN4, to overcome the bias on the first grid of tube CC1. The conduction of tube CC2 causes the potential of its anode to decrease, thereby causing negative bias to be applied to the second control grid of tube CC1. Tube CC1 is thus rendered non-conducting by the negative potential on its second control grid before signals can pass the delay network DN4 to enable the first grid of tube CC1. Tube CC1, therefore, remains non-conducting, causing tube CT to become conducting, thereby changing the potential on conductor 45 from more to a less positive value and thereby preclude the operation of tubes OTH . . . OU.

Thus whenever more or less than two Number circuits operate in response to the identifying signal potential, the identifier is blocked from further operation. If, however, two Number circuits operate, and only two, as evidenced by the change in the potential on conductor 45 from a less to a more positive value as above described, the identifier proceeds with operations by which a digit of the directory number is caused to be registered on the digit registers shown in Fig. 13.

As previously stated, when tubes AG0 . . . AG7 are non-conducting, zero potential is applied to the grids of inverter tubes IG0 . . . IG7, rendering the latter tubes normally conducting. When tubes AG1 and AG2 are operated (for the thousands digit "3" of the present example), potential on the grids of tubes IG1 and IG2 are driven to cut off, quenching said tubes as well as the check tubes CK1 and CK2. Positive potential at the anode of tube IG1 is thereby applied over conductor 19 to the first grid of the four tubes OTH1 . . . OU1 in the digit registers shown in Fig. 13, while the positive potential at the anode of tube IG2 is applied over conductor 20 to the first grid of the four tubes OTH2 . . . OU2 in said registers. The second grids of tubes OTH1 and OTH2 (as well as the remaining three tubes OTH0, OTH4 and OTH7), however, are normally supplied with negative potential over conductor 23 from the negative bias at the cathode of tubes OTH of the Digit Scan circuit, said latter tube remaining in the non-conducting state so long as less than positive potential is applied to its second grid over conductor 45 by virtue of the normal conductivity of tube CT of the Code Check circuit, positive potential being supplied to its first grid when tube ITH was rendered conductive, as will be recalled. Consequently, although positive potential is applied for the first grids of tubes OTH1 and OTH2 of the thousands register by the suppression of conduction in inverter tubes IG1 and IG2, tubes OTH1 and OTH2 will remain non-conducting so long as negative potential is maintained at their respective second grids over conductor 23, which means so long as tube OTH of the Digit Scan circuit remains non-conducting. However, if the operation of the Code Check circuit is that which results from the operation of only two Number circuits, that is Number circuits 1 and 2 in the present example, tube CT will be quenched, as previously described, the potential on conductor 45 will be rendered positive in consequence thereof and tube OTH will be caused to conduct, whereupon the positive potential at the cathode of said latter tube overcomes the normal negative bias connected to said cathode, thereby to result in positive potential being applied to conductor 23. The application of positive potential to the second grids of tubes OTH1 and OTH2 over this conductor then causes the activation of said latter two tubes to register thereby the thousands digit "3" in the thousands digit register in the two-out-of-five code. The positive potential applied to the numerical tubes OH1, OH2, etc., is ineffective at this time since the second grids thereof, being connected to conductors 24, 25 and 26, are at negative potential, derived from the cathodes of the unoperated tubes OH, OT and OU, respectively, of the Digit Scan circuit, which are connected to a negative battery bias at the cathodes of said latter tubes.

When tube OTH operates following the application of positive potential on conductor 45, the positive potential at its cathode is also applied to the first grid of tube IH through the delay network DN1. The purpose of network DN1 is to delay the application of positive potential to the first grid of tube IH for an interval sufficient to permit the numerical tubes OTH1 and OTH2 to operate. These and other numerical tubes of the digit registers, being gas-filled tubes, will remain conducting after the potential on their grids is altered. The negative potential at the anode of tube OTH is also applied through the delay network DN2 to the second grid of tube ITH to suppress conductivity therein after a time interval measured by the constants of delay network DN2. This delay is also part of the time necessary to permit the digit tubes OTH1 and OTH2 to operate. Since the second grids of tubes ITH . . . IU were initially made positive when positive battery on conductor 17 was first applied to the anodes of the tubes OTH . . . OU, it follows that when the first grid of tube IH is made positive by the potential at the cathode of conducting tube OTH, said tube IH is rendered conducting. Further, when negative potential is applied to the first grid of tube ITH as above described, said tube is rendered non-conducting to suppress the conductivity of tube THSL by the application of negative potential to the first grid thereof. The latter tube, when thus rendered non-conducting, causes negative potential to be applied to conductor 11 thereby to suppress the conductivity of the thousands digit tubes TH0 . . . TH7 in the input gate A, in consequence of which tubes TH1 and TH2 will cease to transmit identifying signal potential to the Number circuits 1 and 2 the operation of which, it will be recalled, caused the operation of digit tubes OTH1 and OTH2 to register the thousands digit "3" in the thousands digit register, which tubes continue to remain operated thereafter since they are gas tubes that can be quenched only by the opening of anode battery thereto on conductor 17 or the momentary reversal in the polarity thereof. It will be noted that when tube ITH is rendered non-conducting, the first grid of tube OTH will be rendered negative. However, since tube OTH as well as tubes OH . . . OU are gas-filled tubes, tube OTH will continue to conduct until battery is removed from conductor 17.

Tube IH, upon being rendered conducting after a delay measured by the constants of delay network DN1 which allows time for the suppression of tubes ITH, THSL, the thousands digit tubes TH0 . . . TH7, and the discharge of the capacitor C11, C12 and C13 of the time integrator INTG, renders tube HSL conducting in the same manner as tube ITH rendered tube THSL conducting, whereupon positive potential is applied to conductor 12, thereby to activate the hundreds tubes H0 . . . H7 in the input gates. Since signal potential is present on code conductors 1 and 7 within the bracket H of secondary network SDH connected to input gate A, said potential is transmitted over filter networks HI-1 and HI-7 to the grids of activated tubes H1 and H7 of input gate A, thereby to cause said tubes to activate Number circuits 1 and 7.

Moreover, the conductivity of tube IH causes positive potential to be applied to the grid of tube OH as a condition for operating said tube upon the application of positive potential to its second grid over conductor 45 as a consequence of the operation of the Code Check circuit in determining that two, and only two, Number circuits were activated in response to the hundreds tubes H1 and H7 of input gate A. The operation of tube OH causes positive potential on its cathode to be applied to conductor 24, which conductor, being connected to the second grids of the hundreds tubes OH0 . . . OH7 of the hundreds digit register, will cause tubes OH1 and OH7 to be operated therein upon the application thereto of positive potential from non-conducting tubes IG1 and IG7 when the latter have been rendered non-conducting by tubes AG1 and AG7 in the same manner as previously described for tubes IG1 and IG2. The operation of the two hundreds register tubes OH1 and OH7 registers the hundreds digit "8" of the identified directory number in the two-out-of-five code.

In the same manner and as previously described, the Digit Scan circuit causes the operation of tubes IT and OT, IU and OU in succession, and tubes HSL, TSL and USL to be quenched and operated in succession, thereby to cause the remaining two digits "4" and "7" to be registered in the two-out-of-five code in the tens and units digit registers, respectively, by the operation therein of tubes OT0 and OT4 for the digit "4" in the tens digit register and tubes OU0 and OU7 for the digit "7" in the units digit register.

When tube OU operates, the negative potential at its anode is applied through delay network DN2 associated with said tube, to the grid of tube DM1 which is rendered conducting at the time positive battery on conductor 17 is applied to the anode of tube OU. Hence, when tube OU operates and its anode potential drops to a relatively negative value, the grid of tube DM1 is rendered negative to cut off said tube. Tube DM2, on the other hand, is normally non-conducting owing to the permanent connection of a negative bias to its grid, which is overcome only when tube DM1 is rendered non-conducting and the positive potential at its anode is made effective at said grid, thereby to render tube DM2 conducting and complete the circuit of relay FN over an obvious path including the space path of tube DM2. When relay FN operates, it unlocks relay ST, the latter removing the oscillator OS from the sleeve conductor SL of the connection and disconnecting battery from conductor 17, thereby to remove positive battery from the anodes of the tubes of the identifier and restoring it to normal. It should be noted at this point that the restoration of the identifier upon the release of relay ST will in no wise effect any one of the recorder registers in Figs. 14, 15 or 16 since anode battery for the tubes of these recorder registers is locally supplied by means individual to each recorder register, as further explained below.

When the grid of tube DM2 is rendered positive as above described, the positive potential thereon is applied over conductor 40 to the first grid of each of the gas-filled tubes FR, of which one is provided in each of the recorder registers shown in Figs. 14, 15 and 16. However, prior to the application of this potential to the first grid of said tubes FR, relay 94ST0 in one of said recorder registers, for example, relay 94ST0 of the recorder register shown in Fig. 14, will have been operated for reasons later to be described, in consequence of which positive battery over the right contacts of said relay is applied to the anode of said tube FR over resistor R50 and, also, to the anodes of the register tubes RTH0 . . . RU7 therein.

Relay 94ST0 further closes its outermost left contacts to connect the second grid of tube FR (which is negatively biased) to the anode of said tube via resistor R51. Resistors R50, R51 and R52 are so chosen that with positive potential on the anode and negative voltage on conductor 40, the potential at the common point of resistors R51 and R52 is practically zero, said zero potential then being available to the second grid of tube FR and to the second grids of tubes RTH0 . . . RU7. Since the first grid of tube FR is then rendered positive by the subsequent application of positive potential to conductor 40, it follows that tube FR will be rendered conducting.

Thus as a consequence of the cut-off of tube DM1 readying the identifier for dismissal, tube FR of the register in which relay 94ST0 was operated is enabled.

It has been stated that relay 94ST0 is operated before positive potential is applied to conductor 40. This relay, which is individual to a recording register, is operated in one particular recording register once it is ascertained that said register is the one in which the digital indications of the identified directory number, locked up in the conducting tubes of the digital registers of the identifier, are to be transferred.

In an exchange adapted for identifying directory line numbers and recording said numbers along with other items of record information pertaining to connections such as, for example, in the system disclosed in copending application of W. W. Carpenter and R. E. Collis, Serial No. 759,402, filed July 7, 1947, a recording device is provided for each of a given number of trunks, which device is called into service at the time a particular item of record information is to be recorded for any one of the trunks to which said device has access. These recording devices each have a relay, such as relay 94ST0 for Recorder "0," as set forth in the above-mentioned Carpenter-Collis application, which operates when the recorder is taken into use. In adapting the recording system of my invention to a recording device of the kind shown in said copending application, it is only necessary to add to such a relay as relay 94ST0 a pair of battery supply contacts (the right contacts as shown on the drawing) and a pair of contacts (the outermost left) to join the second grid of tube FR to the anode thereof.

Thus as the result of the operation of relay 94ST0 zero or enabling potential is applied to the first grids of the register tubes RTH0 . . . RU7.

As previously mentioned, the cathodes of the digit register tubes of the identifier are severally extended over conducting paths to the grids of tubes in the several recorder registers shown in Figs. 14, 15 and 16, each of said recorder registers being provided, as said before, with twenty gas-filled tubes RTH0 . . . RU7 corresponding to the tubes in the digit registers of the identifier. When, therefore, the digit tubes OTH1, OTH2, OH1, OH7, OT0, OH4, OU0 and OU7 (for the directory number "3847") of the digit registers of the identifier are rendered conducting as before described, the positive potential available at their respective cathodes is applied over said conducting paths to the first grids of tubes RTH0, RTH2, RH1, RH7, RT0, RT4, OU0 and RU7 of all the recorder registers shown in Figs. 14, 15 and 16. However, since the tubes of the registers shown in Figs. 15 and 16 will not have had their respective relays 94ST0 operated, no enabling potential will have been applied to their respective second grids and no positive battery will have been connected to their respective anodes. The positive potential applied to the grids of tubes RTH0, RTH2, RH1, RH7, RT0, RT4, RU0 and RU7 in said latter registers will, therefore, have no effect.

The register tubes of the register shown in Fig. 14, however, will have had positive battery applied to their respective anodes and enabling potential applied to their respective second grids. The consequence is that when positive potential is applied to the first grids of tubes RTH0, RTH2, RH1, RH7, RT0, RU4, RU0 and RU7 in the recorder register of Fig. 14 from the cathodes of the corresponding tubes in the digital registers of the identifier, said recorder register tubes will be enabled to register thereby the directory number designation therein and to complete individual and obvious circuit paths to the magnets of the recorder by which the digits of the directory number (in the present example "3847") are recorded in the two out-of-five code on the record medium of the recorder.

It should be noted that when tube FR is rendered conducting, the potential at its anode drives towards negative. The zero potential previously available at the common terminal of resistors R51 and R52 by way of the outer contact of relay 94ST0 is therefore rendered negative, which potential is then applied to the second grids of the register tubes RTH0 . . . RU7. Since the tubes are gas-filled, those that were previously enabled will not be affected by the change in potential on their respective second grids, and, therefore, will remain conducting. The tubes which were not rendered conducting, however, will thereafter remain unresponsive to any enabling potential that might be applied to their respective first grids from the cathodes of conducting digital tubes in the identifier if, before relay 94ST0 is released in the recorder register of Fig. 14, the identifier will have reoperated to identify the directory number of some other calling station. The new setting of the digital tubes of the identifier will then be effective only in the register tubes of one or more of the recorder registers other than the register shown in Fig. 14 to which enabling potential will have been applied to their respective second grids and positive battery will have been applied to their respective anodes by the operation of relay 94ST0 in each of said registers.

The recorder register shown in Fig. 16 is arranged to transmit signals of an identified directory number to a remote recorder. The register tubes RTH0 . . . RU7 are operated from the conducting tubes of the identifier over the common conducting paths as previously described for the recorder register of Fig. 14.

The cathodes of each digital group of tubes DTH0 . . . DTH7 . . . DU0 . . . DU7 are connected to a multifrequency Digit Scan circuit which is not shown but which may be of any suitable type, as for instance, a Digit Scan circuit like the one shown in Fig. 9. The second grid of each of said tubes is connected to an individual frequency source f0, f1, f2, f4 and f7, while the anodes thereof are connected to a source of positive battery through the primary winding of transformer TR, the secondary of which is connected to a trunk which terminates in a frequency discriminating and rectifying circuit at the remote exchange where the recorder to be operated is located.

The multifrequency Digit Scan circuit supplies potential to the cathodes of each group of digital tubes DTH0 . . . DTH7; DU0 . . . DU7 in succession. When the cathodes of the tubes DTH0 . . . DTH7 of the thousands group are thus supplied with potential, tubes DTH1 and DTH2 are activated, owing to the fact that their first grids were previously supplied with positive potential from the recorder register tubes RTH1 and RTH2 which, for the thousands digit "3," were enabled by cathode potential from the conducting thousands digit tubes OTH1 and OTH2 of the identifier. The space current through tube DTH1 is modulated by frequency f1, applied to its second grid, and the space current through tube DTH2 is modulated by frequency f2. Since the circuits for such space currents are completed to battery through the primary winding of transformer TR, the frequencies f1 and f2, indicative of the thousands digit "3," are transmitted through the circuit including the secondary winding of said transformer to the frequency responsive device at the remote exchange (not shown). Said frequencies are there separated by suitable filters, rectified and utilized to operate two magnets of the recorder in the two-out-of-five code by means well known in the art.

In the same manner, each of the remaining digits, represented by two frequencies in accordance with the two-out-of-five code is transmitted by successive activation of two tubes in each of the digital groups of tubes DH0 . . . DH7; DT0 . . . DT7 and DU0 . . . DU7. When the entire number of impulses has been transmitted, relay ACA, which corresponds in this instance to the similarly designated relay ACA in Patent No. 2,332,893, releases, it having been operated at the beginning of the transmission cycle in accordance with the teaching of said patent to initiate the transmission of the pulses. Said relay is, of course, similarly modified as relay 94ST0 to include two extra pairs of contacts, the one to furnish anode battery to the tubes and the other to supply zero potential to the second grid of tube FR and to the second grids of tubes RTH0 . . . RU7.

The invention has been described above in a particular embodiment thereof to identify the directory number of telephone stations. It will be evident, however, to one skilled in the art that it is not limited to the particular embodiment disclosed nor to the particular telephone system shown in connection therewith, but that various applications, modifications and arrangements other than those disclosed herein are within the scope of the invention. Thus, for example, it would be entirely practical with but one modification noted hereunder to provide for an office one unit of common equipment comprising the primary and secondary networks, the required number of gate circuits and a plurality of identifiers each comprising the required number of Number circuits and output registers, sleeve and code check circuit and a digit scan circuit. By providing each identifier with an oscillator OS emitting a frequency individual to said identifier and by tuning its associated Number circuits to operate in response to the frequency emitted by its own oscillator only, a plurality of identifiers may simultaneously operate in cooperation with the common networks and gate circuits to identify the numbers of different calling stations. Although the Number circuits of the different identifiers would all be commoned to the code conductors G0' . . . G7, no interference would be possible since the Number circuits of the several identifiers would be tuned to respond to but one frequency, which would be the frequency emitted by the oscillator of the identifier of which said Number circuits are a part.

It should further be noted that the identifier can by an appropriate increase in the number of primary and secondary networks be utilized to identify the directory numbers of stations in a plurality of offices. The primary networks PDN-A and PDN-B as shown necessarily limit identification operations to 10,000 stations, all of which may terminate in one office. However, if a pair of primary networks PDN-A and PDN-B, together with their associated secondary networks SDH and SDV were to be provided for each group of 10,000 stations or less, and by connecting the station conductors of the stations in the several groups to the passive elements in the primary networks reserved for such groups, there would be no limit to the number of stations whose respective directory numbers the identifier may not determine.

It is obvious, of course, that the primary network need not be limited to 100 vertical conductors and 100 horizontal conductors to which the passive elements are connected in the present embodiment of the invention. Economies may be effected in this regard by increasing or decreasing in particular cases the number of vertical and/or horizontal conductors to include in one primary network more or less than 10,000 passive elements with appropriate modifications in the secondary networks. Thus if four offices each containing 10,000 stations were to be served by one identifier, a primary network of two hundred vertical conductors and two hundred horizontal conductors would suffice for the 40,000 passive elements, one for each of the stations in the four offices, suitable modifications of the associated secondary networks being easily understood. Other permutations of vertical and horizontal conductors to accommodate a different total number of stations is evident from the above illustration.

It is further evident that while the secondary networks SDH and SDV have been used to "compress" the code for all directory numbers, the code may in some cases be compressed more economically by the use of tertiary networks to the passive elements of which the conductors from the secondary networks are connected.

It is also to be noted that while the identifier herein described and shown has been limited for convenience to the identification of stations having directory numbers composed of four digits, there is no limit to the number of digital orders that may be identified. It has been indicated and conventionally shown that the "class" digit may be identified by the provision of a "class" network. Although the description of the invention has not included a detailed showing and a detailed description of the apparatus required to identify this digit, it is obvious that the class network, indicated in Fig. 3, is identical in construction and composition to one of the primary networks PDN for which the secondary networks would be similar to the secondary networks SDV and SDH, and for which the gate circuit, indicated in the bottom of Fig. 8, would be the same as any of the other gate circuits. Although a "class" digit register (or registers if the class indication consists of more than one digit) is not shown in the output register of Fig. 13, it is understood that such a register is included as part thereof and is identical in construction to any of the other digital registers therein shown, which reservation is also made for each of the recorder registers severally shown in Figs. 14 to 16, inclusive. In a similar manner, additional digits may be identified, that is, they may be identified by the addition of the required primary networks and the inclusion of the appropriate number of digital registers in the output register of the identifier and each of the recorder registers.

It should further be noted that in the drawings the grids of many of the gas-filled tubes are not shown to be each in series with a protective resistor, as is the customary practice to protect the tubes from overloading when conducting. This is merely a protective measure and the omission of the resistors was to abbreviate, wherever possible in the tracing of the circuits the recitation of anything more than the necessary elements. It should be understood, however, that such resistors are a necessary part of the construction wherever the electrode of a gas-filled tube requires a protective resistor in series with it.

The terms and expressions employed herein in reference to the invention are used as terms of description and not of limitation. I have no intention by the use of such terms and expressions of excluding thereby equivalents of the features disclosed but, on the contrary, intend to include therein any and all equivalents and modifications which may be employed without departing from the spirit of the invention.

What is claimed is:

1. An identifier for determining the designations of telephone stations in a telephone system, comprising in combination with a source of potential, a primary network of passive electrical elements of which one element is individual to each of said stations, a plurality of conductive paths disposed in two arrays with each path indicative of one or more items of the designation of each of said stations, each of said elements in said network being connected to one conductive path in one of the arrays in accordance with an item or items of the designation of its station and to one conductive path in the other array in accordance with the remainder of the items of the designation of its station, and means for applying said source of potential to one of said elements, to effect low-loss electrical transmission for said source along the two conductive paths to which said element is connected and high-loss electrical transmission along all other paths, the resulting potential on said two conductive paths indicating the designation of the station to the passive element of which said source of potential was applied.

2. An identifier according to claim 1 including discriminating means connected to all of said conductive paths and responsive only to the derived potential on said two conductive paths for indicating the designation of the station to the passive element of which said source of potential was applied.

3. An identifier for determining the directory number designations of telephone stations in a telephone system, each of said stations having a four-digit directory number, comprising in combination with a source of potential, a primary network of passive electrical elements of which one element is individual to each station, two groups of one hundred conductive paths, one of said groups being disposed in horizontal array, each path therein designating a pair of thousands and hundreds digits of said station directory numbers, the other of said groups being disposed in vertical array, each path therein designating a pair of tens and hundreds digits of said station directory numbers, each of said passive electrical elements being connected to that conductive path in the horizontal array which designates the thousands and hundreds digits of the directory number of the station to which said element belongs and to that conductive path in the vertical array which designates the tens and units digits of the directory number of said station, means responsive to a calling condition on one of said stations for extending a connection from said calling station, means for applying said source of potential over said extended connection to the passive electrical element of said calling station, thereby to effect low-loss electrical transmission for said source along the horizontal and vertical conducting path to which said element is connected and high-loss electrical transmission along all other conductive paths, and discriminating means connected to all of said conductive paths responsive to the potential available on said two conductive paths only for indicating the four directory number digits of said calling station.

4. An identifier according to claim 3 including recording means responsive to the operation of said discriminating means for recording the four directory number digits of said calling station.

5. An identifier for determining the designations of telephone stations in a telephone system, comprising in combination with a source of potential, a primary network of passive electrical elements of which one element is individual to each station, means for applying said source of potential to any one of said elements, a plurality of conductive paths each expressing one or more items of the designations of each of said stations, said elements being so connected to said paths that the application of said source of potential to any one of said elements effects a low-loss electrical transmission for said source along paths indicative of the designation of the station to which said element is individual and high-loss electrical transmission along all other parts, means connected to said conductive paths for converting the derived potential on said low-loss transmission paths into code signals expressive of the items of designation indicated by said low-loss transmission paths, and discriminating means connected to all of said paths responsive to the derived potential on said low-loss transmission paths for indicating in code the items of designations expressed by said low-loss transmission paths, said items of designation corresponding to the designation of the station to the element of which said source of signal potential was applied.

6. An identifier according to claim 5 in which said conversion means comprises two secondary networks of passive electrical elements, one of said secondary networks being connected to certain of said conductive paths and the other of said secondary networks being connected to the remainder of said conductive paths, and code conductors connected to said two secondary networks, said discriminating means being connected to said code conductors, the derived potential on those of said code conductors which express in code the items of designation corresponding to the designation of said station to the element of which said source of signal potential was applied being transmitted thereto over both of said secondary networks from said low-loss transmission paths.

7. An identifier according to claim 5 in which said conversion means comprises two secondary networks of passive electrical elements to which said conductive paths from said primary network are connected, each element in each of said two secondary networks comprising a number of components, a plurality of code conductors connected to said components according to a code, said discriminating means being connected to said code conductors, the potential on those of said code conductors which express in code the items of designation corresponding to the designation of said station to the element of which in said primary network said source of potential was applied being transmitted to said conductors over components of certain passive electrical elements in said two secondary networks from the low-loss transmission paths connected to said passive electrical elements.

8. An identifier according to claim 5 in which said conversion means comprises two secondary networks of passive electrical elements to which said conductive paths from said primary networks are connected, four groups of code conductors, two for each of said secondary networks, said passive electrical elements in each of said secondary networks being so connected to the code conductors of its two groups that the derived potential available on said low-loss transmission paths effects low-loss electrical transmission on those code conductors of said two groups which indicate the code representation of the items of designation expressed by each of said low-loss transmission paths and high-loss electrical transmission along all other code conductors in said two groups, said low-loss code conductors in all four groups of said code conductors expressing the designation of the station to the element of which in said primary network said source of potential was applied.

9. An identifier according to claim 5 in which the designation of each station comprises a four-digit number and in which said conversion means comprises two secondary networks of passive electrical elements to which said conductive paths from said primary network are connected, four groups of code conductors, two for each one of said secondary networks, each of said groups of conductors comprising five conductors to express in a two-out-of-five code the particular value of one of the four digits of a directory number, said passive electrical elements in each of said secondary networks being so connected to the code conductors of its two groups that the derived potential available on said low-loss transmission paths effects low-loss electrical transmission on those two code conductors in each group which indicate in the two-out-of-five code the value of the digit and high-loss electrical transmission along the three remaining code conductors in the group, said two low-loss conductors in each of said four groups of code conductors expressing in the two-out-of-five code the directory number of the station to the element of which in said primary network said source of potential was applied.

10. An identifier for determining the designation of telephone stations according to claim 5, in which said discriminating means comprises an electronic network connected to each conductor in each of said groups of code conductors, each of said electronic networks being adjusted for response to the potential on a low-loss code conductor, the operation of the networks in response to said potential on the low-loss code conductors indicating the designation of the station to the element of which in said primary network said source of potential was applied.

11. An identifier for determining the designations of telephone stations in a telephone system, a plurality of said stations being connected to one or more of a plurality of lines, comprising in combination with means for extending a connection from one of said stations in response to a calling condition thereon, means operative upon the extension of said connection to determine the identity of said calling station, and a source of alternating potential, of a plurality of primary networks of passive electrical elements, each one of said primary networks being individual to correspondingly disposed stations on different lines, there being in each of said primary networks a passive electrical element for each of said correspondingly disposed stations, means for applying said source of potential over said extended connection to the passive element of said calling station in the primary network that contains said element, a plurality of conductive paths for each primary network, each path being indicative of one or more items of the designations of each of said stations, the passive elements in a network being so connected to said conductive paths that the application of said source of potential to the passive element therein of said calling station effects a low-loss electrical transmission for said source along paths indicating the items of the designation of said calling station and high-loss electrical transmission along all other paths, a gating circuit for each primary network, and means responsive to the operation of said station determining means for rendering effective the one gating circuit individual to the primary network containing the passive element of the calling station to which said signal potential was applied.

12. An identifier for determining the designation of telephone stations according to claim 11, including a private conductor for each station connected to the passive element of the station in the one of the primary networks containing said passive element, and means for applying said potential to the passive element of a calling station over the private conductor of said station and a conductor of the extended connection from said calling station.

13. An identifier for determining the designations of telephone stations according to claim 11, including a terminal for each line, a terminal for each station and a private conductor for each station, connections between the terminal of a line and the terminals of the stations connected to said line, each of said private conductors being connected between the terminal individual to the station and the passive element of the station in the one of the primary networks containing said passive element, means for applying said source of potential over a conductor of said extended connection and over the private conductors of all stations on the line of the calling station to the passive elements of said stations in said primary networks, a gating circuit for each primary network, and means responsive to the operation of said station determining means for rendering effective the one gating circuit individual to the primary network containing the passive element of the calling station to which said source of potential was applied.

14. An identifier according to claim 11, including a pair of secondary networks of passive electrical elements for each of said primary networks, each of said secondary networks comprising a plurality of passive electrical elements, each one of said conductive paths of a primary network being connected to a passive element in one of the two secondary networks individual to said primary network, code conductors connected to said passive elements in each of said pair of secondary networks, said code conductors indicating in code one or more items of the designations of said stations indicated by said conductive paths, the connection between the conductive paths of a primary network and the passive elements of the two secondary networks individual to said primary network and the connection between said passive elements in each of said secondary networks and the code conductors being such that the derived potential on the low-loss conductive paths resulting from the application of said source of potential to the passive element of said calling station in a primary network effects low-loss electrical transmission for said potential along those code conductors in the two secondary networks individual to said primary network which indicate in code the items of the designation of said calling station and high-loss electrical transmission to said derived potential along all other code conductors in said two secondary networks, a gating circuit for each pair of secondary networks, means responsive to the operation of said station determining means for rendering effective the one gating circuit individual to the two secondary networks associated with the primary network containing the passive element of the calling station to which said source of signal potential was applied, and discriminating means responsive to the derived potential on said low-loss code conductors for indicating in code the items of the designation of said calling station.

15. An identifier according to claim 11, including a pair of secondary networks of passive electrical elements for each of said primary networks, each of said secondary networks comprising a plurality of passive electrical elements, each one of said conductive paths of a primary network being connected to a passive element in one of the two secondary networks individual to said primary network, code conductors connected to said passive elements in each of said pair of secondary networks, said code conductors indicating in code one or more items of the designations of said stations indicated by said conductive paths, the connection between the conductive paths of a primary network and the passive elements of the two secondary networks individual to said primary network and the connection between said passive elements and the code conductors of a secondary network being such that the derived potential on the low-loss conductive paths resulting from the application of said source of potential to the passive element of said calling station in a primary network effects low-loss electrical transmission for said derived potential along those code conductors in the two secondary networks individual to said primary network which indicate in code the items of the designation of said calling station and high-loss electrical transmission to said potential along all other code conductors in said two secondary networks, a gating circuit for each pair of secondary networks, means responsive to the operation of said station determining means for rendering effective the one gating circuit individual to the two secondary networks associated with the primary network containing the passive element of the calling station to which said source of potential was applied, discriminating means responsive to said low-loss code conductors in said two secondary networks, and recording means responsive to the operation of said discriminating means for recording in code the items of the designation of said calling station.

16. An identifier for determining the designations of telephone stations according to claim 11, including a termination network connected to each station terminal, said termination network having an impedance substantially less than the impedance of the passive electrical element correlated to said station.

17. An identifier for determining the designations of telephone stations according to claim 11, including a termination network connected to each station terminal, the impedance of said termination network being substantially less than the impedance of the passive element correlated to said station, the value of said impedances being such as to permit the effective transmission over said connection of a potential from said source of the order of 30 kilocycles.

18. An identifier for determining the designation of telephone stations according to claim 11, including a station terminal as a part of said extended connection, and a termination network connected to said station terminal, said termination network including a capacitor, the impedance of said termination network being of substantially less than the impedance of the passive electrical element correlated to said station.

19. A telephone system comprising in combination with a plurality of telephone stations each having an arbitrary designation, of means for extending a connection from one of said stations in response to a calling condition thereon, a source of alternating potential, means for connecting said source of potential to a conductor of said extended connection, an identifier for determining the arbitrary designation of said calling station, means responsive to the application of said source of potential to said conductor for determining the impedance of said conductor, and means responsive to the operation of said impedance determining means for controlling the operation of said identifier, thereby to determine the arbitrary designation of said calling station.

20. A telephone system according to claim 19 in which said impedance determining means includes discriminating means responsive to the value of potential derived from the impedance of said conductor consequent to the connection of said source of potential thereto, and means in said identifier responsive to said discriminating means in the event that said derived potential is within predetermined limits for controlling the operation of said identifier.

21. A telephone system according to claim 19 in which said impedance determining means comprises an electronic network including a normally conductive electronic device and having positive potential on one of its electrodes, means responsive to the connection of said source of potential to said conductor for maintaining the conductivity of said device in the event that the impedance of said conductor is within predetermined limits, and means responsive to the positive potential on said electrode for controlling the operation of said identifier.

22. A telephone system according to claim 19 in which said impedance determining means comprises an electronic network including a normally conducting electronic device having positive potential on one of its electrodes for controlling the operation of said identifier, means responsive to the potential derived from the connection of said source of potential to said conductor for arresting the conductivity of said device, thereby to change said positive potential on said electrode to negative potential in the event that the value of said derived potential is outside predetermined limits, said negative on said electrode precluding further operation of said identifier.

23. A telephone system according to claim 19 in which said source of potential is a source of alternating potential and in which said impedance determining means comprises a detector responsive to the potential derived from the connection of said source of potential to said conductor, serially connected filtering, amplifying and rectifying networks including an output tube responsive to the operation of said detector for amplifying, filtering and suppressing the negative half cycles of said potential, thereby to obtain from said output tube a direct-current potential which is proportional to the amplitude of the alternating potential applied to said detector, two electronic devices connected in parallel at the output of said tube, the one of said devices being adjusted for conductivity when the value of the potential at said output tube is proportional to the value of said derived potential within predetermined limits, said one electronic device being rendered non-conducting by a decrease in the potential available at said output tube, the other of said devices being adjusted to be cut off when the value of the potential available at said output tube is proportional to the value of said derived potential within predetermined limits, said other electronic device being rendered conducting by an increase in potential available at said output tube, thereby to render said one electronic device non-conducting, and a third electronic device connected to said one electronic device and adjusted to be non-conducting when said one electronic device is conducting, said third electronic device being rendered conducting either when both of said two electronic devices are rendered non-conducting in response to a decrease in potential of said output tube consequent to said derived potential being less than its predetermined limit, or when the first of said two electronic devices is rendered non-conducting and the second of said two electronic devices is rendered conducting in response to an increase in potential of said output tube consequent to said derived potential being greater than its predetermined limit, and means responsive to the conductivity of said third electronic device for arresting the further operation of said identifier.

24. In a telephone system, the combination with stations each having identifying designations comprising a number of digits or characters, means responsive to a calling condition on one of said stations for extending a connection therefrom, and a source of potential applied to said extended connection, of an identifier for determining the identifying designation of each of said stations comprising means responsive to said potential for producing a plurality of derived potentials expressing in code each digit or character of the identifying designation of said calling station, a plurality of number circuits equal to the maximum number of elements of the code in which each of said digits or characters is expressed, means for rendering said number circuits selectively responsive to the derived potentials for each digit or character, and a plurality of registers successively responsive to each operation of said number circuits for registering the code of each digit or character of the identifying designation of said calling station.

25. A telephone system according to claim 24 in which said source of potential is a source of alternating potential and in which each of said number circuits comprises a detector responsive to one of said derived potentials, filtering and rectifying devices responsive to the frequency and amplitude of said derived potentials for converting the same into a direct-current potential proportional to the amplitude of the alternating potential applied to said extended connection, and a time integrator responsive to said rectified potential for delaying the application of said rectified potential to said register for the time required to operate said time integrator.

26. A telephone system according to claim 24 in which said source of potential is a source of alternating potential and in which each of said number circuits comprises an amplifier and detector responsive to one of said derived potentials, filtering and amplifying devices responsive to the frequency and amplitude of said derived potential for converting the same into a direct-current potential proportional to the amplitude of the alternating potential applied to said extended connection, a time integrator responsive to said rectified potential comprising a capacitor-resistor network, means responsive to the amplitude of the rectified and integrated direct-current potential for rendering effective the response of said register, and a conductor connected to said last-mentioned means and to one of said registers for applying said rectified and delayed potential to said register.

27. A telephone system according to claim 24 in which said source of potential is a source of alternating potential and in which each of said number circuits comprises a detector responsive to one of said derived potentials, filtering and rectifying devices responsive to the frequency and amplitude of said derived potential for converting the same into a direct-current potential proportional to the amplitude of the potential applied to said connection, and a time integrator responsive to said rectified potential comprising a capacitor-resistor network, a conductor connected to said network and to one of said registers, thereby to delay the application of said rectified potential to said register for the time required to charge said capacitor, and a discharging network for dissipating the charge accumulated on said capacitor in the event that said rectified potential is applied to said capacitor for less than a predetermined time interval.

28. A telephone system according to claim 24 in which said source of potential is a source of alternating potential and in which each of said number circuits comprises a detector responsive to one of said derived potentials, filtering and rectifying devices responsive to the frequency and amplitude of said derived potential for converting the same into a direct-current potential proportional to the amplitude of the potential applied to said connection, and a time integrator responsive to said rectified potential comprising a plurality of capacitor-resistor networks connected in cascade, and a conductor connected to the last of said networks and to one of said registers for delaying the application of said potential to said register for the period required to charge each of said capacitors.

29. A telephone system according to claim 24 in which said source of potential is a source of alternating potential and in which each of said number circuits comprises a detector responsive to one of said derived potentials, filtering and rectifying devices responsive to the frequency and amplitude of said derived potential for converting the same into a direct-current potential proportional to the amplitude of the potential applied to said connection, and a time integrator responsive to said rectified potential comprising a plurality of capacitor-resistor networks connected in cascade, a conductor connected to the last of said networks and to one of said registers for delaying the application of said potential to said register for the period required to charge each of said networks, and a common discharge network for all of said networks whereby the charge accumulated on one or more of said capacitors is dissipated in the event that the potential applied thereto is removed before all of said capacitors are fully charged.

30. An identifier for determining the characters or digits of the identifying designations of telephone stations in a telphone system, comprising in combination with an alternating potential applied to a terminal of one of said stations in response to a calling condition thereon, of networks responsive to said potential for producing a plurality of derived potentials expressing in code the digits or characters of the identifying designation of said calling station, a plurality of number circuits equal in number to the elements of said code, means for rendering one or more of said number circuits simultaneously operative in response to the derived potentials for the code of each digit or character of said designation, and register means responsive to each operation of one or more of said number circuits for registering the code indication of each digit or character of the identifying designation of said calling station.

31. An identifier according to claim 30 in which said means for rendering one or more of said number circuits simultaneously operative in response to the derived potentials for the code expression of each digit or character of said designation includes a code check circuit comprising means responsive to the operation of the appropriate number of said number circuits to the derived potentials expressing the code of a digit or character of the identifying designation, means responsive to the operation of said code check circuit for controlling the response of said number circuits to the derived potentials expressing the code of the next digit or character of the identifying designation, and means responsive to the operation of said code check circuit in the event that more or less of said number circuits operate than called for by the number of derived potentials expressing the code of a digit or character for arresting further response of said number circuits to other of said derived potentials.

32. An identifier according to claim 30 in which said means for rendering one or more of said number circuits simultaneously operative in response to the derived potentials for the code expression of each digit or character of said designation includes a code check circuit comprising a normally operative electronic device for each one of said number circuits, each of said electronic devices being rendered non-conducting in response to the operation of its associated number circuit, two other electronic devices connected in parallel at the output of said number circuit electronic devices, the one of said two other electronic devices being adjusted for conductivity when the required number of said number circuit electronic devices are rendered non-conducting in response to the operation of a corresponding number of number circuits to the derived potentials of the code expression of a digit or character, and the other of said two electronic devices being adjusted for non-conductivity when the required number of said number circuit electronic devices are rendered non-conducting in response to the operation of a corresponding number of number circuits to the derived potentials of the code expression of a digit or character, and a third electronic device rendered nonconductive by the conductivity of said one electronic device, thereby to render effective said means for rendering said number circuits successively operative, said third electronic device being rendered conductive by the non-conductivity of said one electronic device, thereby to render ineffective said means for rendering said number circuits successively operative.

33. In a telephone system, the combination with telephone stations each having an identifying designation comprising digits or characters, and an identifier for identifying the designation of one of said stations in response to a calling condition thereon, of a register in said identifier settable in response to the identified designation of said calling station, a plurality of other registers permanently connected by conductive paths to said identifier register, and individual means in each of said plurality of registers operable to effect a setting of the register in response to and in accordance with the setting of said identifier register.

34. A telephone system as set forth in claim 33, in which said identifier register comprises a plurality of electronic devices, and each of said plurality of registers comprises a corresponding number of electronic devices, an electrode in each of said electronic devices in said identifier register being connected to an electrode in a corresponding electronic device in each of said plurality of registers, and individual means in each of said plurality of registers operable to supply potential to another electrode in the electronic devices of the register, thereby to operate those of said electronic devices in said register to which potential was applied to an electrode thereof over one of said conducting paths from an electrode of a corresponding electronic device in said identifier register.

35. A telephone system as set forth in claim 33, in which each of said plurality of registers includes a recording device operable in response to the setting of the associated register to record the identified designation of said calling station.

36. A telephone system as set forth in claim 33, in which said identifier register comprises a plurality of gas-filled electronic devices, and each of said plurality of registers comprises a corresponding plurality of gas-filled electronic devices, the cathodes of the gas-filled electronic devices in said identifier register being connected to grid electrodes of the gas-filled electronic devices in each of said plurality of registers, and individual means in each of said plurality of registers operable to supply potential to the anode electrodes of the gas-filled electronic devices therein, thereby to render operable in the register in which said means are operated those gas-filled electronic devices to which potential is applied from the cathodes of corresponding gas-filled electronic devices in said identifier register, said operated gas-filled electronic devices in said register remaining thereafter unaffected by any change in the potential applied to their respective grids, and a recording device in each of said plurality of registers, the recording device of the register having the operated gas-filled electronic devices being responsive thereto for recording the identified designation of said calling station.

37. A telephone system as set forth in claim 33 in which one or more of said plurality of registers each includes means responsive to the setting thereof for producing time-spaced impulses expressing the digits or characters indicated by the setting.

38. A telephone system as set forth in claim 33 in which one or more of said registers each includes a plurality of frequency sources, means responsive to the setting of a register containing said frequency sources for selectively combining said frequencies in time-spaced relation to express the digits or characters indicated by the setting of said register, and means responsive to the operation of said last-mentioned means for producing time-spaced frequency impulses indicative of said digits or character.

DICK S. BARLOW.

References Cited in the file of this patent

UNITED STATES PATENTS

| Number | Name | Date |
|---|---|---|
| 2,072,234 | Wochinger | Mar. 2, 1937 |
| 2,238,223 | Kozma | Apr. 15, 1941 |
| 2,244,700 | Horton | June 10, 1941 |
| 2,252,766 | Holden | Aug. 19, 1941 |
| 2,265,844 | Korn | Dec. 9, 1941 |
| 2,270,123 | Horn | Jan. 13, 1942 |
| 2,289,939 | Stehlik | July 14, 1942 |
| 2,338,242 | Haigh | Jan. 4, 1944 |
| 2,547,804 | Baker | Apr. 3, 1951 |